United States Patent
Schilling et al.

(10) Patent No.: US 6,733,194 B2
(45) Date of Patent: May 11, 2004

(54) ARRANGEMENT FOR CONTROLLING PRINTING IN A MAIL-PROCESSING DEVICE

(75) Inventors: Tilmann Schilling, Berlin (DE);
Torsten Schlaaff, Zepernick (DE);
Joachim Jauert, Berlin (DE)

(73) Assignee: Francotyp-Postalia AG & Co. KG, Birkenwerder (DE)

(*) Notice: Subject to any disclaimer, the term of this patent is extended or adjusted under 35 U.S.C. 154(b) by 0 days.

(21) Appl. No.: 10/614,326

(22) Filed: Jul. 7, 2003

(65) Prior Publication Data

US 2004/0064424 A1 Apr. 1, 2004

(30) Foreign Application Priority Data

Jul. 4, 2002 (DE) .......................................... 102 30 678

(51) Int. Cl.[7] .......................... B41L 2/315; B41J 47/46; G08K 15/00
(52) U.S. Cl. ...................... 400/120.01; 101/71; 101/91; 400/61; 400/70; 358/1.1; 358/1.16; 358/1.18
(58) Field of Search .......................... 101/91, 71, 484; 400/120.01, 61, 70, 630, 642, 103; 358/1.1, 1.16, 1.18; 347/5, 12, 33 R; 705/408

(56) References Cited

U.S. PATENT DOCUMENTS

| | | | |
|---|---|---|---|
| 4,746,234 A | 5/1988 | Harry ..................... | 400/120.01 |
| 4,978,971 A | 12/1990 | Goetz et al. .................... | 347/5 |
| 5,117,374 A | 5/1992 | Goetz ........................ | 702/150 |
| 5,146,546 A * | 9/1992 | Neuhard et al. ........... | 358/1.16 |
| 5,155,499 A | 10/1992 | Goetz et al. .................... | 347/12 |
| 5,471,925 A * | 12/1995 | Heinrich et al. .............. | 101/91 |
| 5,608,636 A | 3/1997 | Guenther ................... | 705/408 |
| 5,651,103 A | 7/1997 | Arsenault et al. .......... | 358/1.18 |
| 5,707,158 A | 1/1998 | Hansel et al. ................. | 400/61 |
| 5,710,721 A | 1/1998 | Rieckhoff et al. ............. | 714/51 |
| 5,790,768 A | 8/1998 | Windel et al. .............. | 358/1.18 |
| 5,808,747 A * | 9/1998 | Telle ........................... | 358/296 |
| 5,894,792 A * | 4/1999 | Heinrich et al. ............... | 101/91 |
| 5,953,426 A | 9/1999 | Windel et al. ................. | 380/51 |
| 5,983,291 A * | 11/1999 | Leger et al. .................. | 710/52 |
| 6,041,704 A | 3/2000 | Pauschinger ................. | 101/91 |
| 6,493,597 B1 * | 12/2002 | Linares et al. ................ | 700/83 |

FOREIGN PATENT DOCUMENTS

| | | |
|---|---|---|
| EP | 762 334 | 3/1997 |
| EP | 921 008 | 6/1999 |
| EP | 921 009 | 6/1999 |
| EP | 1 132 868 | 9/2001 |
| EP | 1 154 382 | 11/2001 |
| EP | 1 176 016 | 1/2002 |

OTHER PUBLICATIONS

Xilinx, "Spartan–II 2.5 V FPGA Family: Functional Description" Mar. 5, 2001, pp. 1–45.

* cited by examiner

Primary Examiner—Charles Nolan, Jr.
Assistant Examiner—Wasseem H. Hamdan
(74) Attorney, Agent, or Firm—Schiff Hardin LLP

(57) ABSTRACT

An arrangement for controlling the printing in a mail-processing device has a print data controller for pixel data editing while printing with a print heads. The print data controller is composed of a pixel data-editing unit and a circuit including a DMA controller, an address is generator and a printer controller. The DMA controller allows access to the binary pixel data stored in the pixel memory in order to make the data available to the pixel data-editing unit in data strings. The address generator generates addresses that are supplied to the pixel data-editing unit for the selection of the binary pixel data from an intermediately stored data string and for grouping in the required sequence. The printer controller drives the pixel data-editing unit in order to supply the binary pixel data in groups to a driver unit for the print head.

14 Claims, 9 Drawing Sheets

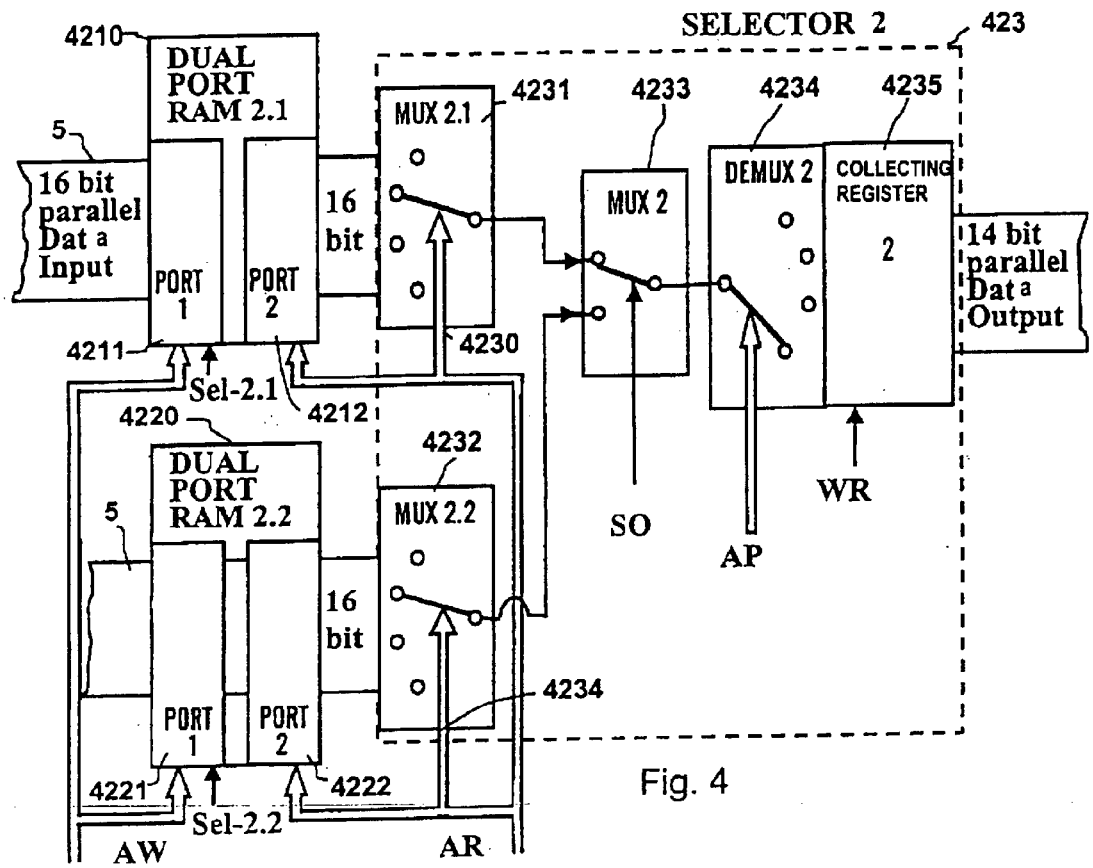
Fig. 4
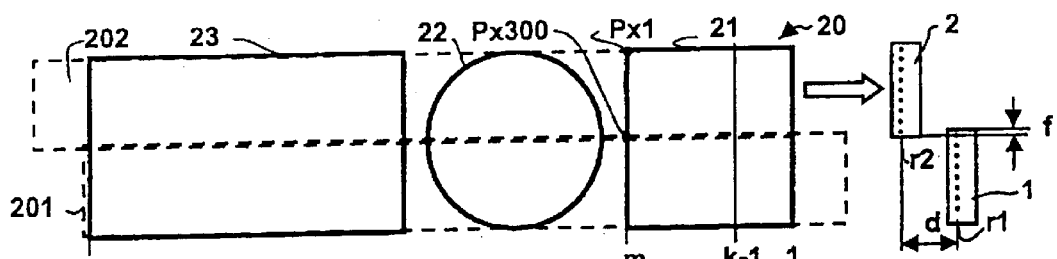
Fig. 5a
Fig. 5b
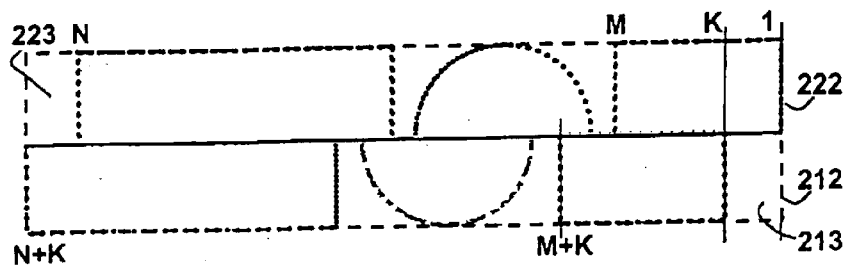
Fig. 6

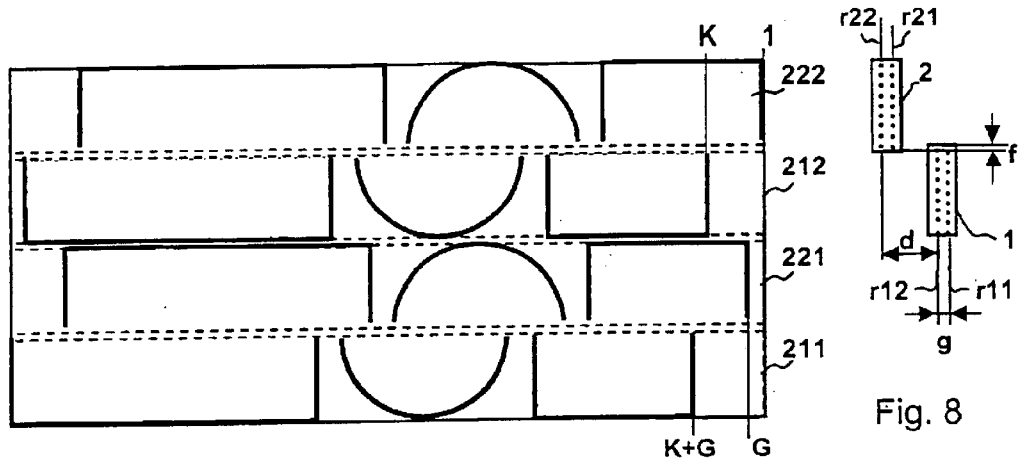
Fig. 7
Fig. 8
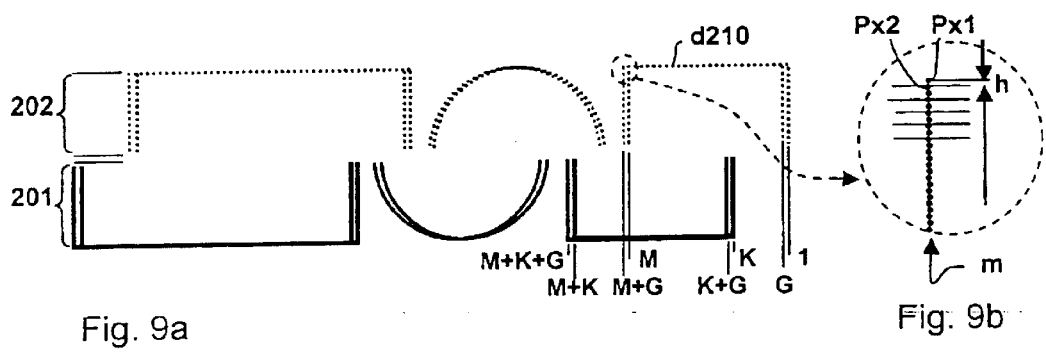
Fig. 9a
Fig. 9b
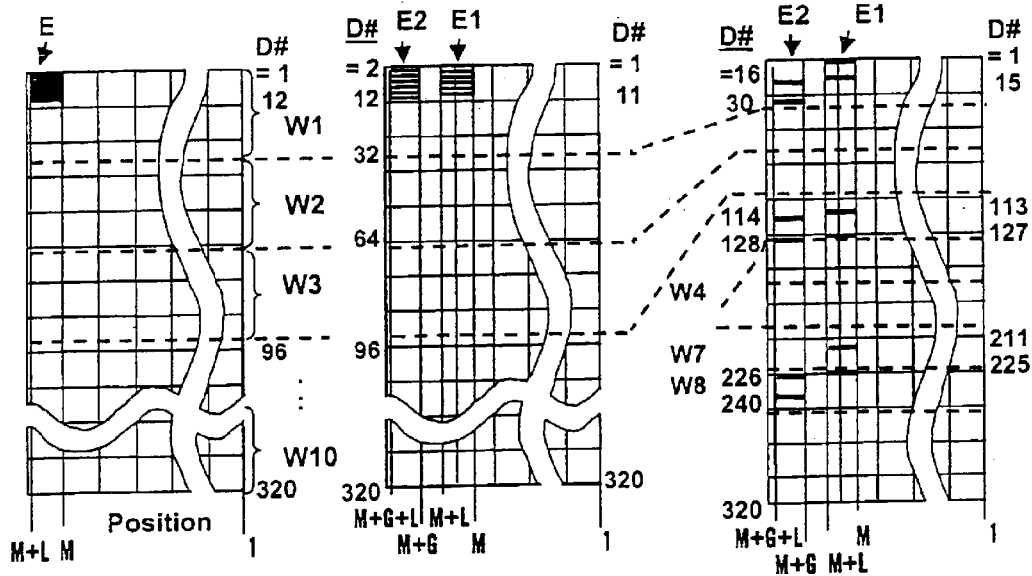
Fig. 10a
Fig. 10b
Fig. 10c

| Address primitiv:= P | P = 1 | P = 2 | P = 3 | P = 4 | P = 5 | P = 6 | P = 7 | P = 8 | P = 9 | P = 10 | P = 11 | P = 12 | P = 13 | P = 14 |
|---|---|---|---|---|---|---|---|---|---|---|---|---|---|---|
| Address Group := A | | | | | | | Address read := C | | | | | | | |
| 1 | 0 | 509 | 44 | 41 | 88 | 85 | 132 | 129 | 176 | 173 | 220 | 217 | 264 | 261 |
| 2 | 6 | 3 | 50 | 47 | 94 | 91 | 138 | 135 | 182 | 179 | 226 | 223 | 270 | 267 |
| 3 | 12 | 9 | 56 | 53 | 100 | 97 | 144 | 141 | 188 | 185 | 232 | 229 | 276 | 273 |
| 4 | 18 | 15 | 62 | 59 | 106 | 103 | 150 | 147 | 194 | 191 | 238 | 235 | 282 | 279 |
| 5 | 24 | 21 | 68 | 65 | 112 | 109 | 156 | 153 | 200 | 197 | 244 | 241 | 288 | 285 |
| 6 | 30 | 27 | 74 | 71 | 118 | 115 | 162 | 159 | 206 | 203 | 250 | 247 | 294 | 291 |
| 7 | 36 | 33 | 80 | 77 | 124 | 121 | 168 | 165 | 212 | 209 | 256 | 253 | 300 | 297 |
| 8 | 510 | 39 | 42 | 83 | 86 | 127 | 130 | 171 | 174 | 215 | 218 | 259 | 262 | 303 |
| 9 | 4 | 1 | 48 | 45 | 92 | 89 | 136 | 133 | 180 | 177 | 224 | 221 | 268 | 265 |
| 10 | 10 | 7 | 54 | 51 | 98 | 95 | 142 | 139 | 186 | 183 | 230 | 227 | 274 | 271 |
| 11 | 16 | 13 | 60 | 57 | 104 | 101 | 148 | 145 | 192 | 189 | 236 | 233 | 280 | 277 |
| 12 | 22 | 19 | 66 | 63 | 110 | 107 | 154 | 151 | 198 | 195 | 242 | 239 | 286 | 283 |
| 13 | 28 | 25 | 72 | 69 | 116 | 113 | 160 | 157 | 204 | 201 | 248 | 245 | 292 | 289 |
| 14 | 34 | 31 | 78 | 75 | 122 | 119 | 166 | 163 | 210 | 207 | 254 | 251 | 298 | 295 |
| 15 | 508 | 37 | 40 | 81 | 84 | 125 | 128 | 169 | 172 | 213 | 216 | 257 | 260 | 301 |
| 16 | 2 | 511 | 46 | 43 | 90 | 87 | 134 | 131 | 178 | 175 | 222 | 219 | 266 | 263 |
| 17 | 8 | 5 | 52 | 49 | 96 | 93 | 140 | 137 | 184 | 181 | 228 | 225 | 272 | 269 |
| 18 | 14 | 11 | 58 | 55 | 102 | 99 | 146 | 143 | 190 | 187 | 234 | 231 | 278 | 275 |
| 19 | 20 | 17 | 64 | 61 | 108 | 105 | 152 | 149 | 196 | 193 | 240 | 237 | 284 | 281 |
| 20 | 26 | 23 | 70 | 67 | 114 | 111 | 158 | 155 | 202 | 199 | 246 | 243 | 290 | 287 |
| 21 | 32 | 29 | 76 | 73 | 120 | 117 | 164 | 161 | 208 | 205 | 252 | 249 | 296 | 293 |
| 22 | 38 | 35 | 82 | 79 | 126 | 123 | 170 | 167 | 214 | 211 | 258 | 255 | 302 | 299 |

Fig. 14

ARRANGEMENT FOR CONTROLLING PRINTING IN A MAIL-PROCESSING DEVICE

BACKGROUND OF THE INVENTION

1. Field of the Invention

The present invention is directed to an arrangement for controlling the printing in a mail-processing device, particularly in postage meter machines, addressing machines and other mail-processing devices.

2. Related Applications

The subject matter of the present application is related to the subject matter of co-pending applications entitled "Method and Arrangement for Processing Printer Errors During Printing in a Mail Processing Device"; U.S. application Ser. No. 10/614,443 "Arrangement for Printing a Print Image Having Regions With Different Print Image Resolution"; U.S. application Ser. No. 10/614,476 and "Arrangement for Controlling Printing in a Mail Processing Device"; U.S. application Ser. No. 10/614,280 all filed simultaneously herewith.

DESCRIPTION OF THE PRIOR ART

U.S. Pat. No. 4,746,234 discloses a postage meter machine with a thermal transfer printer that allows the print image information to be easily changed. Semi-permanent and variable print image information is electronically stored as print data in a memory and read out into a thermal transfer-printing device for printing. This solution was employed in the commercial postage meter machine T1000 offered by Francotyp-Postalia AG & Co. KG and was the first-time that an advertising imprint could be changed by pressing a button.

A method and an arrangement for internal cost center printing are available for department-by-department accounting of the value of postage fees consumed with the postage meter machine T1000, with a print image that is rotated by 90° or 270° being generated by means of a specific print controller (European Application 580 274, U.S. Pat. No. 5,790,768).

Printing business cards, fee stamps and court costs stamps is also possible with the T1000 machine, i.e. generating print images that differ considerably in structure and content from a franking imprint.

A franking imprint usually comprises a postal value stamp, a postmark image with the mail-receiving location and date as well as the aforementioned advertising image and is generated in the aforementioned sequence with, for example, the postage meter machine T1000 by means of printing print columns arranged perpendicular to the transport direction of the item being franked. The overall print column is imprinted by a single thermal transfer printhead. The machine can thus achieve a maximum throughput of franking matter of 2200 letters/hour with a print resolution of 240 dots per 30 mm, i.e. 203 dpi, but the manual feed of franking items limits the throughput of franking items that can be achieved in practice.

European Application 578 042 (corresponding to U.S. Pat. No. 5,608,636) discloses a method for controlling the column-by-column printing of a postage imprint, wherein encoded image information are converted before the printing event into binary signals for driving print elements, whereby the converted, variable and invariable image are not be compiled until during printing. The decoding of the variable print data and offering of the print data for a complete column in a register ensue by means of a microprocessor. Since the data for the next print column must be edited in the time between two print columns, the computing time of the microprocessor must be in conformity with the proportion of variable print data, the level of franking items, throughput of franking items, and the print resolution. This increases the busload and limits the possibility of printing a franking imprint onto franking items faster. The franking imprint contains postal information including the postage fee data for delivering the letter. Modern postage meter machines enable a security imprint, i.e. an imprint of a specific marking in addition to the aforementioned information. For example, the aforementioned information is used to generate a message authentication code or a signature and a character string or a bar code as a marking. When a security imprint is printed with such a marking, this enables a review of the authenticity of the security imprint, for example in the post office or on the premises of a private carrier (U.S. Pat. Nos. 5,953,426 and 6,041,704).

In some countries, due to the development of postal requirements for a security imprint, the amount of variable print image data that must be modified between two imprints of different franking stamps is very high. For Canada, for example, a data matrix code of 48×48 picture elements must be generated and printed for every individual franking imprint.

An ink jet printhead can be composed of a number of modules according to the "non-interlaced" principle when the spacings between the nozzles are too large and the number of nozzles of a module are inadequate for printing a printing width of 1 inch (=25.4 mm) with one module given a resolution of approximately 200 dpi. In the ink printhead of the commercial postage meter machine JetMail®, for example, three modules are arranged offset from one another in the column direction of the print image. Each module has only one row of nozzles with 64 nozzles and the modules are arranged slanted to such an extent relative to the print column so that each nozzle row describes an acute angle relative to the transport direction of the materials to be franked. The individual nozzles of each module therefore do not print along a print image column but print along a diagonal that intersects the columns of the print image. As a consequence, pixel offset errors accumulate when the transport velocity is not correctly acquired. Despite acquiring the movement of the franking matter in the transport direction with a high-quality encoder, it is difficult to print a line straight in the direction of the print image column. The individual modules and their offset from one another, moreover exhibit tolerances that arise in the manufacture of the modules. Below a size that is spaced one print image column from the next, a print pulse is supplied with different delay for each module.

A method and an arrangement for tolerance compensation are described in European Applications 921 008 and 921 009, wherein individual printhead data are stored in a non-volatile memory of the printhead and taken into consideration in the print pulse delay. When the pixel offset error exceeds the size by which a print column is spaced from the next, then the binary pixel data in the pixel memory must be changed.

A solution for print image generation for the JetMail® disclosed by U.S. Pat. No. 5,707,158 and European Application 762 334 describes how the data describing a complete print image are generated and stored before the printing, and is based on a control datafile for field-by-field generation of the print image in a pixel memory before the printing. The print-image is defined in image sub-datafiles of the control datafile and is stored as pattern in pixel datafiles. So that the printer device can directly access the pixel data, binary pixel data are not stored in a pixel memory in the sequence along a print image column but are stored as a modified pattern along a diagonal in three sub-regions lying above one another in order to compensate changes in the pattern caused due to the non-interlaced arrangement of the modules. The solution is based on complete patterns of binary pixel data modified dependent on a pixel data change unit, the binary pixel data being intermediately stored in the pixel memory. The print images are compiled before the printing such that the images are read by a print data controller directly from the pixel memory into a shift register, and are serially transmitted to a shift register in the printhead and can be transferred into a latch. The print data controller is realized together with other assemblies in an ASIC (U.S. Pat. No. 5,710,721, European Application 1 154 382).

Some postal demands can be satisfied only with this solution since the microprocessor is supported by the specific pixel data change unit in the ASIC on the Jetmail® CPU board when modifying the image data of variable picture elements. The pixel data change unit is capable of modifying the variable picture elements between successive frankings such that these are stored in the form of binary pixel data in a pixel memory before the printing. The arrangement of the picture elements (pixels) in the pixel memory required for the printing is not beneficial for the modification of picture elements by the microprocessor because of the oblique position of the print modules of the printhead, and would require a high computing outlay. Even given support by a pixel-editing unit, this can only modify a small number of variable picture elements between the imprints.

U.S. Pat. No. 5,651,103 discloses an apparatus and a method for column-by-column printing of an image in real time, wherein variable and fixed image data elements are connected to one another and deposited in a buffer in order to then be used for printing a column. The variable and fixed image data elements are stored in a non-volatile memory, with some of the fixed image data elements being compressed. The print image data for printing each print column are compiled from variable and invariable image data only before they are printed, i.e. the image data for an imprint are not present in binary form in a memory area but in a form that is comparable to the method disclosed by European Application 578 042 for the T1000. The variable image data elements in the non-volatile memory are identified by a controller, and data that correspond to the variable image data elements are transferred to a further controller in order to download the variable and fixed image data elements, unite them with one another, and then print them. The controller proposed for this requires a variable address register for each variable image data element. The number of variable image data thus is limited by the number of address registers.

A postal half-inch ink jet printhead with bubble-jet technology is currently employed in some postage meter machines, this being arranged in a cartridge of, for example, the type HP 51640 of Hewlett Packard and being protected by special means (European Application 1 132 868). 300 nozzles are arranged in two nozzle rows in the half-inch ink jet printhead, these being arranged orthogonally relative to the transport direction of the franking matter and arranged offset relative to one another in the column direction of the print image and in the transport direction of the franking matter ("interlaced" principle).

European Application 1 176 016 A2 discloses ink jet printheads that are specifically protected and drivable for a franking imprint in greater detail. In order to print a franking imprint having a print column length of 1 inch=25.4 mm and having a maximum resolution of up to 600 dpi in the print image column direction with a postage meter machine in one pass of the franking item, two half-inch ink jet printheads are arranged offset relative to one another in the print image column direction and in the transport direction of the franking item. The print image is generated from the print image columns in this orthogonal arrangement relative to the transport direction of the franking matter, with each of the printheads printing a part of the print image column. The machine thus can achieve a high throughput of franking items (5500 letters an hour). The quantity of print image data that must be modified between two imprints is not only very large but also must be made available in a shorter time. When, however, the storing of the binary print image data in the pixel memory for the pixels ensues in the specific sequence in which the pixel data are required for the drive of the two postal half-inch ink jet printheads with bubble-jet technology when printing a column, then the print image is mapped in the pixel memory as a correspondingly modified pattern of binary pixel data. The modification of picture elements by the microprocessor thus becomes complicated again and requires a high computing outlay that can be achieved in the required time only by means of an expensive microprocessor, or the throughout of franking matter is correspondingly reduced.

SUMMARY OF THE INVENTION

An object of the present invention is to provide an economical solution for control of the printing in a mail-processing device which achieves a high throughput of postal items and uses a high-resolution printhead, wherein the variable print image part can be extensive and can be flexible for different postal demands. By simple intermediate storage and address calculation before the printout of the pixel data, the microprocessor responsible for the control of a complete mail processing system should be relieved.

The above object is achieved in accordance with the principles of the present invention in a mail-processing device having at least one printhead operable by a print data controller having access to a pixel memory, in which binary pixel data are stored in data words, with a predetermined number of successive data words forming a data string, and wherein the print data controller includes a DMA (direct memory access) controller and an address generator and, for each printhead, a print data editing unit. The pixel data-editing unit contains two buffer memories connected to the DMA controller. The address generator and the DMA controller are connected to the pixel editing unit to transfer a data string, among a number of stored data strings, from the pixel memory into one of the two buffer memories, with successive data words in the one of the data strings being alternatingly entered into one of the two buffer memories by the DMA controller, while editing the data words stored in the other of the two buffer memories at addresses designated by the address generator for use in printing. The next successive data string stored in the one of said two buffer memories, is taken therefrom and edited by the print-editing unit.

The modification of picture elements by the microprocessor is simplified and requires less computing outlay when the part of the print image to be printed by the printhead is in the form of binary pixel data in the pixel memory so that an optimally large number of binary pixel data of a picture element can be modified with each command of the microprocessor. In the inventive print data controller having a pixel data editing for each printhead, the pixel data-editing units are driven by a specific controller in order to transfer binary pixel data from the pixel memory into a buffer memory word-by-word and in order to select binary pixel data pixel-by-pixel. The pixel data are written into a collecting register of the respective pixel data editing unit and are subsequently transferred in groups into a shift register, so that the data are supplied from the shift register in the specific sequence as the pixel data are needed when printing a print image column with at least one printhead.

The pixel data belonging to a print image column are arranged in the pixel memory such that the microprocessor can modify variable picture elements in the available time. Since the pixel data for two complete print images are deposited in the pixel memory, the pixel data of the one print image can be employed for printing a franking in alternation and parallel in time with the modification of variable pixel data of the other print image, which is yet to be printed, by the microprocessor. Preferably, two printheads are provided with at least a part of each print image column of the print image being printed out by each printhead. Two printheads in an orthogonal arrangement relative to the transport direction each can print half a column length of a print image column. The two halves of the same print image column are printed offset in time since the printheads are arranged offset in the transport direction of a piece of mail. Moreover, each of the two printheads can have two nozzle rows. Every other pixel on this half column length is a pixel with an even column number of a first print image and is printed by nozzles of the second nozzle row. The remaining pixels with odd column numbers of the print image are printed offset in time on this half column length by the nozzles of the first nozzle row since the first nozzle row is offset from the second nozzle row by a distance in the transport direction, this offset being smaller than the aforementioned offset of the two printheads from one another. A data string of binary pixel data from the pixel memory composed of a number of successive data words yields an identical image of the pixel with even column numbers of the first print image and of the pixels with odd column numbers of a second print image that are printed by a printhead having two nozzle rows. When a number of such data strings stored in the pixel memory is arranged in the sequence by columns, a printing of an identical image of at least a part of the print image printed with a printhead thus occurs, this now being able to be efficiently modified. Using commands and data from a read-only memory, the microprocessor of the postage meter machine generates binary pixel data and stores the data word-by-word in the pixel memory.

Since this arrangement of the pixel data, however, does not yet correspond to the sequence in which the pixel data are required for the drive of the printhead, the inventive print data controller causes the nozzles of the printheads to be driven in a predefined sequence and according to the values of the binary pixel data for printing a print image column. The pixel data required for printing at least one print image column are transmitted by direct memory access into respective buffer memories by (half) words for each printhead and are intermediately stored therein. Using an address generator in the print data controller, the bits corresponding to the individual pixels are transmitted into respective collecting memories for the binary pixel data of the respective printhead from the buffer memory in the sequence required by the printheads, and are then loaded in groups into a shift register with the bit length of one of the nozzle groups, and are subsequently serially transmitted to the drive units that are provided for the drive of the printheads.

Two buffer memories are provided for each of the printheads, with one of the buffer memories being loaded by direct memory access in alternation while the other is being read out in order to transmit the binary pixel data to the driver units. The loading and readout of the buffer memories, which are preferably implemented as dual port RAMs, preferably ensues via separate ports of the buffer memories. After the microprocessor has initialized the direct memory access and started the printing of a print image, an encoder that supplies a pulse rate corresponding to the transport speed of the franking item triggers the loading of the buffer memories and the printing of the pixel data of the data string. The pixel data are arranged in the pixel memory such that the direct memory access can execute a specific number of cycles with one encoder clock in order to thus load the pixel data for the next data string into the corresponding buffer memories. A data string counter is incremented in the print data controller with each encoder clock. The printing is ended when a predefined value has been reached. An advantage of this solution is that a modification of the variable image data in the pixel memory by an economical microprocessor can be realized during a franking or between successive frankings because the arrangement of the pixel data in the pixel memory enables an efficient processing of the variable picture elements by the microprocessor, and the microprocessor is relieved of the print control. A high degree of flexibility with respect to the scope and the implementation of the variable print image elements is thereby established.

DESCRIPTION OF THE DRAWINGS

FIG. 4 is a pixel data-editing unit for the second printhead.

FIG. 5a shows a print image for a postage meter machine having two printheads.

FIG. 5b shows arrangement of the two printheads for printing a print image.

FIG. 6 is an illustration of pixel data from two print half-images in the pixel memory.

FIG. 7 is an illustration of pixel data for four print half-images in the pixel memory.

FIG. 8 shows an arrangement of the two printheads for printing the print image with double the resolution.

FIG. 9a is an illustration of pixel data for four print half-images in the pixel memory in a preferred arrangement thereof.

FIG. 9b is an illustration for the column-by-column printing of pixels.

FIG. 10a is an illustration of the binary pixel data of a picture element that are stored in a pixel memory.

FIG. 10b is an illustration of the binary pixel data of a picture element that is stored in divided form in the pixel memory.

FIG. 10c is an illustration of the binary pixel data of a picture element in the pixel memory that are stored in a known way.

FIG. 14 is a table related to the address generation.

DESCRIPTION OF THE PREFERRED EMBODIMENTS

Figure 1A:
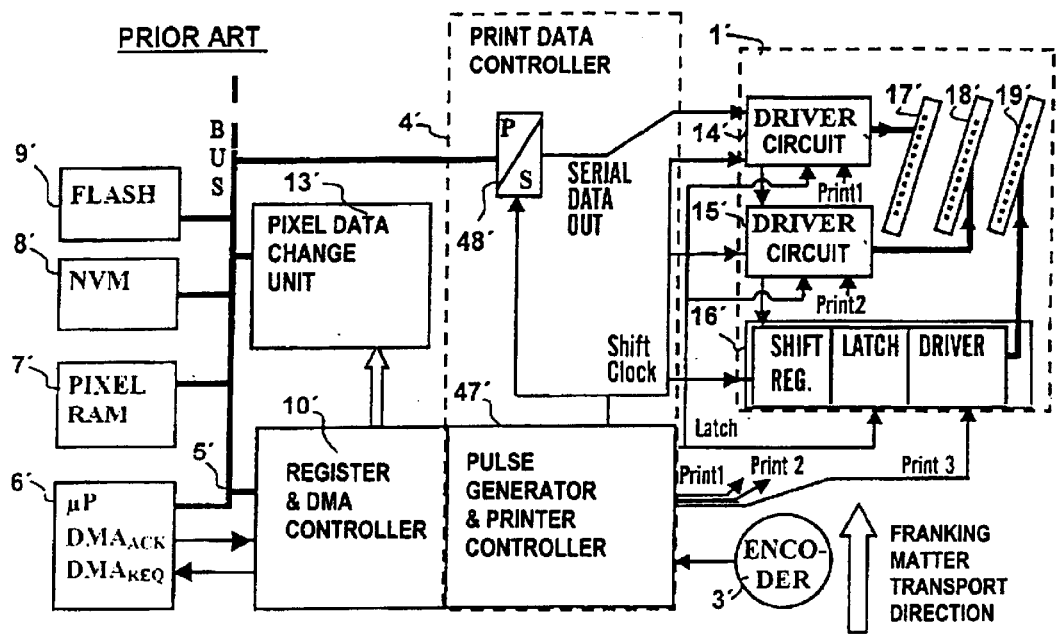
FIG. 1a is a block circuit diagram for the print data editing in the postage meter machine JetMail®.

FIG. 1a shows the block circuit diagram for the print data editing in the postage meter machine JetMail®. Via a bus 5', at least a microprocessor 6', a pixel memory RAM 7', a non-volatile memory NVM 8' and a read-only memory FLASH 9' are connected to a print data controller 4' in terms of address, data and control. A pixel data change unit 13' serves for modifying the pixel data of variable picture elements in the pixel memory 7' and relieves the microprocessor. The printing with the specific printhead 1' requires that specific changes be undertaken in the sequence or in the pattern of the binary pixel data in the pixel memory. The printhead 1' has three obliquely disposed ink print modules in "non-interlaced" arrangement, each having only one print row and generating a slanted ink track upon output of a print pulse. The binary pixel data are taken from the pixel memory 7' for three ink print modules are converted into serial data by a parallel-to-serial converter 48' and are transmitted to the printhead. A standard shift register is utilized for the parallel-to-serial converter 48'. The print data controller 4' implemented as an application-specific circuit (ASIC) is disclosed in greater detail in European Application 716 398 (corresponding to U.S. Pat. No. 5,710,721).

The electronics of the ink print modules is shown in simplified form because the structure of all driver circuits for the three ink print modules 17', 18' and 19' is the same. The driver circuits—referenced as driver circuits 14', 15' and 16' in the block circuit diagram of FIG. 1a—convert serial input data into parallel binary pixel data for each of the ink print modules 17', 18' and 19', the parallel binary pixel data being stored in a buffer memories (latch). The structure of the driver circuit 16' has been shown in greater detail. The serial print data are successively shifted in a shift registers of the driver circuits 14', 15' and 16' by a shift clock and are subsequently transmitted into latches by means of a latch command. The driver transistors of the output side are rendered conductive by print signals Print1, Print2, Print 3 for a specific time dependent on the latch contents in order to activate the piezo actuators that eject ink drops as a result. U.S. Pat. No. 5,758,402 and European Application 713 776 disclose in detail that each of the driver circuits 14', 15' and 16' has two respective, circuit modules, with a circuit module being arranged together with the aforementioned driver circuits on board carrier at both sides relative to the ink print module. Respective 32-bit latches are connected to the parallel outputs of 32-bit shift registers and 32 driver transistors are connected at the output side for driving 32 piezo-actuators.

Figure 1B:
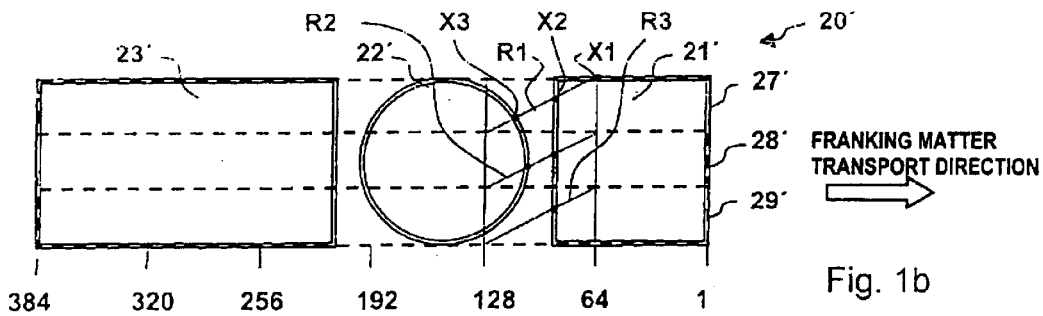
FIG. 1b shows a simplified print image of a postage meter machine.

FIG. 1b shows a simplified print image 20' having a franking stamp image 21', postmark image 22' and an advertising stamp image 23' as well as having an indicated position of the print rows of the three modules of a printhead. A comparable arrangement exists in the postage meter machine JetMail®, which has been in use since 1997. For the three modules, the print image 20' is divided into three regions 27', 28' and 29' parallel to each other. Opposite to the transport direction of the franking matter the module 17' only prints the region 27', the module 18' only prints the region 28' and the module 19' prints only the region 29'. For simplified illustration, each of the stamp images has been reduced to an outside frame and has been drawn with a double line so that the corresponding pixels arranged on the frame are visible. Only for qualitative explanation, a number of print image columns is assumed that is meaningful for a column-by-column printing, even though, of course, no column-by-column printing is possible with the above-described arrangement of the three modules. Each of the three regions 27', 28' and 29' is thus intersected by print image columns disposed orthogonally to the transport direction of the franking matter. The module 17' prints the franking item in the region 27' along a row R1, the module 18' prints in the region 28' along a row R2 and the module 19' prints in the region 29' along a row R3. The rows R1, R2, and R3 lie parallel to one another. A first nozzle of the first nozzle row R1 aligns with a first nozzle of the second nozzle row R2 and with a first nozzle of the third nozzle row R3 . It can be seen that a first pixel X1 lies in the print image column 64 is printed by a first nozzle in the nozzle row R1. Further nozzles in the nozzle row R1 print a second and third pixel X2 and X3 at the same point in time, the latter, for example, being in the seventy-second and eightieth print image columns. The other nozzles up to the sixty-fourth nozzle of the nozzle row R1 are not driven since no further pixel of the simplified print image is to be printed on a piece of mail (not shown) transported under this row. The sixty-fourth nozzle in the nozzle row R1 would print in the one hundred twenty-eighth print image column if a pixel therefor were needed in the print image. The other nozzle rows R2 and R3 are spaced from the first nozzle row R1. Respective pixels of the two other nozzle rows R2 and R3 align in the print image column 72 with the second pixel X2 in the nozzle row R1, with each of these pixels lying in a separate region 27', 28' and 29'.

Figure 1C:
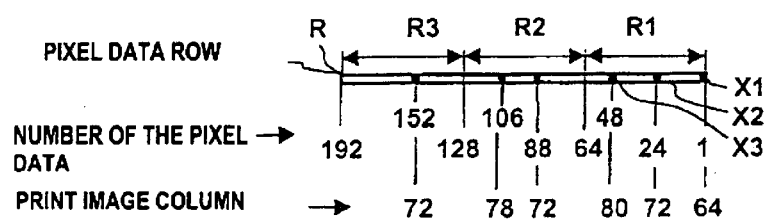
FIG. 1c is a row of binary pixel data.

FIG. 1c illustrates a row of binary pixel data, with the row R being composed in simplified fashion of series-connected binary pixel data of the nozzle rows R1, R2 and R3. Binary data (ones and zeroes) are stored in the pixel memory of a postage meter machine. Only for illustration, the bit values (ones) to be printed are shown as a point on the row. An illustration of the bit values (zero) not to be printed was foregone for clarity. The binary pixel data in this row R are numbered from 1 to 192 from right to left. In the illustrated example, the binary pixel data for a first pixel X1 with the number 1 would effect a printing in the print image column 64, those for the pixels with the numbers 24, 88 and 152 would effect a printing in the print image column 72, those for the pixel with the number 48 would effect a printing in the print image column 80, and those for the pixel with the number 106 would effect a printing into the print image column 78. In a comparable sequence a number of such rows are stored in the pixel memory of a postage meter machine such as JetMail®. Thus, pixel data that have been stored in the pixel memory at a great distant from one another in terms of address result in a print image wherein the pixels are neighbors and are in one print image column. As can be easily imagined, a pattern that cannot be recognized without further difficulty as a transformed reflection of the print image exists in the pixel memory. This complicates the error search in the case of print images that are incorrectly printed and reduces the possibility of undertaking changes in the print image in a fast and simple way. This disadvantage is eliminated by the inventive solution.

Figure 2:
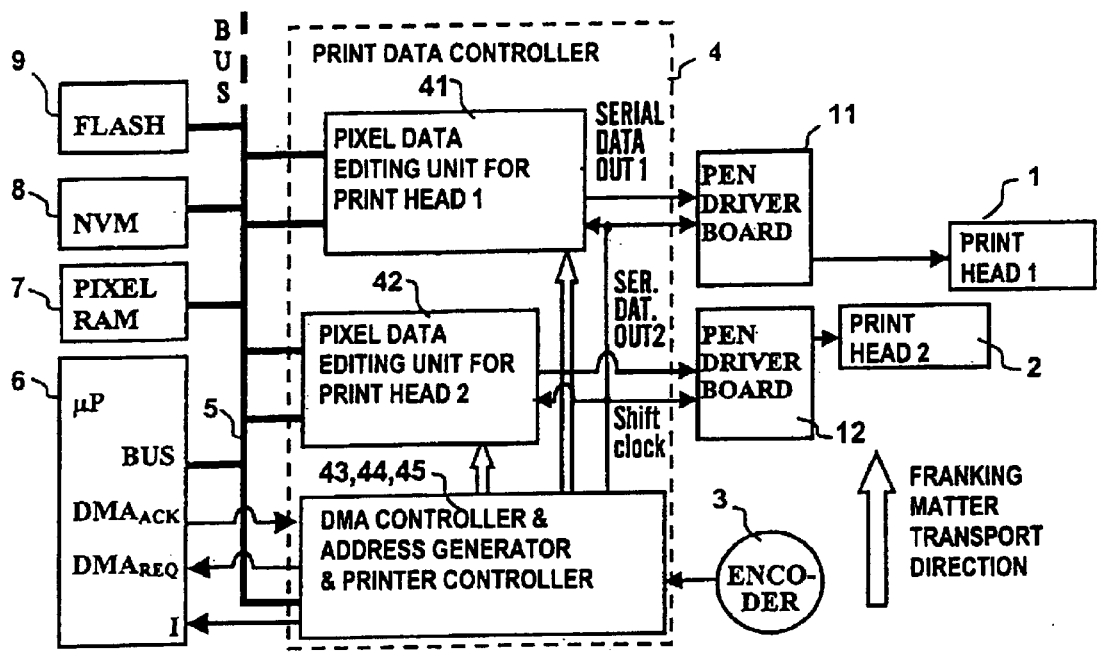
FIG. 2 is a block circuit diagram for the pixel data editing by a print data controller.

FIG. 2 shows the block circuit diagram of a preferred circuit arrangement for the pixel data editing by a print data controller. First and second printheads 1 and 2 are respectively connected via driver units (pen driver board) 11 and 12 to a print data controller 4 that, given a direct memory access, accepts 16-bit binary print image data in parallel from a bus 5 at its input side, and outputs serial binary print image data to the driver units 11 and 12 at its output side. Via the bus 5, at least a microprocessor 6, a pixel memory 7, a non-volatile memory 8 and a read-only memory are connected in terms of address, data and control. An encoder 3 is connected to the print data controller 4 in order to trigger the intermediate storing of the binary pixel data and the printing of the print image columns, each printhead 1 and 2 being operated with a maximum clock frequency of 6.5 KHz. An ink jet printer that is postally secured for a franking imprint and can be driven via an appertaining driver unit (pen driver board) and that is arranged in an ink cartridge of the type HP 51645A of Hewlett Packard is disclosed in greater detail in European Patent Application EP 1 176 016. The print data controller 4 has a first and second pixel data-editing units 41 and 42 and the appertaining controls 43, 44 and 45. A printer controller 45 is connected to a DMA controller 43 and to an address generator 44 and the address generator 44 is connected in terms of control to the pixel data-editing unit 41, 42. The printer controller 45 is directly connected to the microprocessor 6 via the bus 5 and via a control line for an interrupt signal I. The DMA controller is connected to the microprocessor 6 via a control line for DMA control signals $DMA_{ACK}$, $DMA_{REQ}$.

Figure 3:
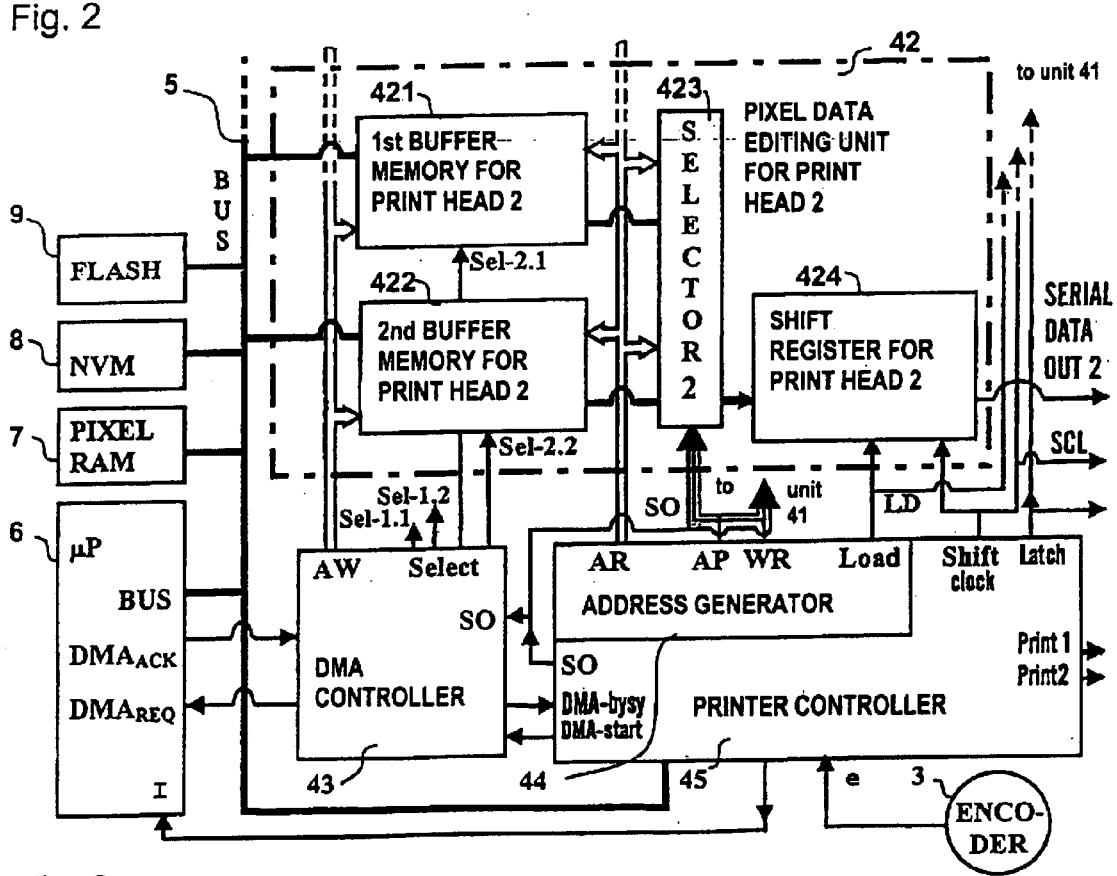
FIG. 3 is an excerpt from the circuit arrangement according to FIG. 2 with a pixel data-editing unit for the second printhead.

FIG. 3 shows an excerpt from the circuit arrangement according to FIG. 2 with a pixel data-editing unit 42 for the second printhead, with a DMA controller 43 for a direct memory access (DMA) as well as with the circuits of an address generator 44 and of a printer controller 45 arranged in a circuit block. The encoder 3 is connected to the printer controller 45. The latter is directly connected to the DMA controller 43 via control lines for first DMA control signals (DMA start and DMA busy), and the DMA controller 43 is supplied with the DMA start signal by the printer controller 45, and the DMA controller 43 outputs the DMA busy signal having the value "zero" to the printer controller 45 in order to indicate that the direct memory access is ensuing and the DMA cycles have ended.

The printer controller 45 is connected to the microprocessor 6 via the bus 5 and via a control for an interrupt signal I, and is connected to the address generator 44 via a control line for supplying an address generator start signal, and also is connected to the DMA controller 43 via a control line for a switchover signal SO. At least the microprocessor 6, the pixel memory 7, the non-volatile memory 8 and the read-only memory 9 are connected via the bus 5 in terms of address, data and control. The printer controller 45 generates a switchover signal SO in order to drive the pixel data editing unit 42. As a result, the pixel data of the first or the second of the two buffer memories 412 and 422 are selected for a transmission to the driver unit 12. As a result thereof, the binary pixel data of a further data string can be supplied by groups to the driver unit 12. The printer controller 45 supplies the switchover signal SO to the DMA controller 43. The DMA controller 43 generates selection signals Sel_2.1, $Sel_{13}$ 2.2 dependent on the switch status of the switchover signal SO in order to intermediately store the binary pixel data in the first buffer memory 421 or the second buffer memory 422. Given a transmission of pixel data from the one of the two buffer memories 421 or 422 to the driver unit 12, the other buffer memory is successively selected by the selection signals for the intermediate storage of a data string. The binary pixel data are made available to the pixel data-editing unit 42 by data strings.

The pixel data of a print image column occupy only half the space per ½-inch printhead, i.e. 10×32 bits, in the pixel memory. Preferably, the microprocessor 6 and the pixel memory 7 have a 32-bit data bus available in order to access the pixel data by words. An internal DMA controller of the microprocessor 6 also allows the addressing of 16-bit data words. The second pixel data editing unit 42 for the second printhead has a first and second buffer memories 421 and 422 that are connected to the bus 5 at the input side but are only connected thereat to the less-significant 16 bits of the data bus. The intermediate storage of a data string consequently requires that an intermediate storage of 20*16-bit data words be successively undertaken into two buffer memories, the buffer memories being selected by the selection signals.

As used herein the terms "data word" and "by words" in the following exemplary embodiments means a 16-bit data word unless the data word length is expressly indicated.

The DMA controller 43 is connected in terms of control to the microprocessor 6 and to the buffer memories 421 and 422. The DMA controller 43 generates address write signals AW that, given an access onto the binary pixel data stored in the pixel memory 7, allow the data to be written into the buffer memories 421, 422 of the pixel data editing unit 42. For addressing by words, the DMA controller 43 supplies a 5-bit address write signal AW. The signal AW is at a separate address input of the first and second buffer memories 421 and 422 for pixel data for the second printhead. The DMA controller 43 supplies a first selection signal Sel_2.1 for pixel data for the second printhead and this is at a separate control input of the first buffer memory 421 for pixel data for the second printhead. The DMA controller 43 supplies a second selection signal Sel_2.2 for pixel data for the second printhead and this is at a separate control input of the second buffer memory 421 for pixel data for the second printhead.

The address generator 44 generates address signals AR, AP and control signals WR, LD, and the address signals AR, AP and the control signals WR, LD are supplied to the pixel data editing unit 41, 42 for the selection of the intermediately stored pixel data and their grouping in a predefined sequence.

Each pixel data editing unit has two buffer memories, a selector for the selection of the binary pixel data and a shift register for the parallel-to-serial conversion of the binary pixel data offered in a new sequence. The address generator 44 supplies the generated address read signals AR to the buffer memories and to the selector of the pixel data-editing unit. The primitive address signals AP and the write control signal WR are supplied to the selector and a load signal LD is supplied to the shift register. Moreover, the printer controller 45 supplies the switchover signal SO to the selector 423. The address generator 44 supplies an address read signal AR for the selection of the data word with the pixel data that are intended for the second printhead. For addressing by words, the more-significant bits of the address read signal AR are at a separate address inputs of the first and second buffer memories 421 and 422. The four less-significant bits of the address read signal AR are at an address input of a second selector 423 and allow an addressing within the 16-bit wide data word. The parallel data outputs of the first and second buffer memories 421 and 422 for pixel data for the second printhead are at a first and second inputs of the selector 423 that, controlled by the address generator 44, supplies a 14-bit parallel data signal at its output to the parallel data input of a shift register 424 for pixel data for the second printhead. The shift register 424 is controlled by a shift clock signal SCL of the printer controller 45 and outputs a serial data output signal SERIAL DATA OUT 2. For the control of the selector 423, the address generator 44 also outputs a primitive address AP and a write signal WR. The address generator 44 outputs a load signal LD to the shift register 424. The printer controller 45 outputs signals Latch and Print2 for the control of the en driver board 12 and is connected to the DMA controller 43 via at least two control lines for the control signals DMA start and DMA busy. Via a control line for the output of the signal SO, the printer controller 45 is connected to corresponding control inputs of the DMA controller 43 and the pixel data-editing unit 42.

The printer controller 45 evaluates the address and control signals communicated via the bus 5, these being evaluated in view of the occurrence of a print command and is in communication with the DMA controller 43 via at least one control line.

Triggered by a print command, the printer controller 45 outputs a first control signal DMA start to the DMA controller 433. In response thereto, the DMA controller generates a request signal $DMA_{REQ}$ and sends this to the microprocessor 6. The microprocessor has an internal DMA controller (not shown) available to it that, given a direct memory access, applies a specific address to the pixel memory (RAM) 7. As a result a communication by words of binary pixel data to the buffer memory via the bus 5 is enabled. To that end, the DMA controller 43 supplies an address write signal AW to the buffer memory. Via the DMA, the microprocessor 6 can, for example, read a 16-bit wide data word with pixel data out from the pixel memory 7 and communicate it to the print data control unit. The microprocessor 6 sends an acknowledge signal $DMA_{ACK}$ to the DMA controller 43 in order to synchronize the generation of the address write signal AW in the DMA controller 43 with the DMA cycle of the microprocessor 6. The executive sequence in the DMA controller shall be explained in even greater detail later on the basis of FIG. 12.

Per DMA cycle, a 16-bit wide data word with binary pixel data proceeds into a buffer memory. After 20 DMA cycles, each of the four buffer memories can offer a total of 320 bits for further data editing. For achieving a print resolution of 600 dpi, two of the four buffer memories are used for write-in during the DMA cycles. Given write-in and readout of pixel data for the second printhead by words, the two buffer memories 421 and 422 alternate. During the DMA cycles, the DMA controller 43 therefore supplies first and second selection signals Sel_2.1 and Sel_2.2 in alternation for the word-by-word storage of pixel data for the second printhead. For alternating and word-by-word storage of pixel data for the second printhead, for example, the DMA controller 43 supplies a first selection signal Sel_2.1 and an address write signal AW. The number of pixels desired for each print image column requires that a total of 40 data words of 16 bits each be intermediately stored in two of four buffer memories. Circuitry for emitting the second control signal DMA busy and for realizing at least one cycle counter for a predefined number of 16-bit data words is provided in the DMA controller 43.

In the same way (not shown in detail), the binary pixel data for the first printhead are supplied by words via the bus 5 and are at a corresponding data input of the first and second buffer memories 411 and 412 for pixel data for the first printhead. The first pixel data-editing unit 41 (not shown in detail) for the first printhead likewise has first and second buffer memories 411 and 412. Each has an input side connected to the least significant 16 bits of the data bus of the bus 5. The address write signal AW supplied by the DMA controller 43 is at a separate address input of each of the first and second buffer memories 411 and 412 for pixel data for the first printhead. The DMA controller 43 supplies a first selection signal Sel_1.1 for pixel data for the first printhead and applies this to a separate control input of the first buffer memory 411 for pixel data for the first printhead. The DMA controller 43 supplies a second selection signal Sel_1.2 for pixel data for the first printhead and applies this to a separate control input of the second buffer memory 412 for pixel data for the first printhead.

The address read signal AR supplied by the address generator 44 is likewise in turn applied to a separate address input of the first and second buffer memories 411 and 412 for pixel data for the first printhead and to a first selector 413. The parallel data outputs of the first and second buffer memories 411 and 412 for pixel data for the first printhead are connected to first and second inputs of the selector 413. The selector 413, controlled by the address generator 44, supplies a 14-bit parallel signal at its output to the parallel data input of a shift register 414 for pixel data for the first printhead. The shift register 414 is controlled by the shift clock signal SCL of the printer controller 45 and outputs a serial data output signal "serial data out 1". The printer controller 45 outputs a shift clock SCL to the shift register 414 for pixel data for the first printhead as well as signals latch and Print1 for the control of the pen driver board 11. Via a control line for the output of the signal SO, the printer controller 45 is connected to a corresponding control input of the DMA controller 43 and to the pixel data-editing unit 41.

The cycle counter of the DMA controller 43 is a word counter for a predefined number of 16-bit data words that is started by a DMA start signal. The DMA controller is, for example, a component of an application-specific circuit (ASIC), wherein the cycle counter is connected to the aforementioned circuit for the generation and output of address write signals AW, and to a circuit for the generation and output of selection signals. The latter (not shown) includes at least one output means and first and second comparators. The first comparator drives the output means dependent on the SO signal in order—until a first predefined number of 16-bit data words is reached—to emit a selection signal Sel_1.1 or Sel_1.2 intended for the first pixel data editing unit 41 and in order—after the first pre-defined number of 16-bit data words has been reached—to emit a selection signal Sel_2.1 or Sel_2.2 intended for the second pixel data editing unit 42. After a pre-defined number of 40* 16-bit data words has been reached, the second comparator generates a DMA busy signal with the value "zero" and is connected to a control line that is connected to the cycle counter in order to end the counting of DMA cycles.

While the pixel data for a data string are being loaded by direct memory access (DMA) into the respective first intermediate memories 411 and 421 and are being intermediately stored therein, the respective second intermediate memories 412 and 422 can be read out. Using the specific address generator 44 and the selectors 413, 423, the binary pixel data are read out from these buffer memories in the sequence required by the printheads, are collected in groups and subsequently serially transmitted to the two printheads by means of shift registers 414, 424. At least one half of a print image column is printed by the first printhead and at least one other half of a print image column is printed by the second printhead.

As a result of this solution, binary pixel data can be stored in the pixel memory in an optimum order that relieves the microprocessor in the modification of the print image. The microprocessor is likewise relieved by the data transmission by DMA.

A data string counter (not shown in detail) is realized in the printer controller 45, each data string containing the aforementioned number of 40*16-bit data words.

After the binary pixel data taken from a data string and edited have been printed, the data string counter is incremented at the occurrence of the left edge of the encoder clock. When a predefined value U has been reached, then the printing of the print image, preferably a franking imprint, is ended.

FIG. 4 shows the pixel data-editing unit for the second printhead in greater detail. The first and second buffer memories 421 and 422 for pixel data for the second printhead are realized, for example, as dual port RAMs 4210 and 4220. The latter are selected for the read-in of the binary pixel data by the first selection signal Sel_2.1 or the second selection signal Sel_2.2 supplied from the DMA controller is to a separate control input of the first port 4211 of the first dual port RAM 4210 or the first port 4221 of the second dual port RAM 4220. An address write signal AW is applied to the first ports 4211 and 4221 for reading the bits. The bits that were previously read in are subsequently read out from the first dual port RAM 4210 or the second dual port RAM 4220. To that end, the more significant part of an address read signal AR is applied to the second port 4212 or 4222, the address read signal AR being supplied from the specific address generator 44. The manner by which the bits are brought into a sequence needed by the second printhead is described below. By means of a first multiplexer 4231, a following, second selector 423 selects a single bit of the binary pixel data from the 16 bits when the least significant part of the address read signal AR is present at its address input 4230, whereby this address read signal AR likewise being supplied by the specific address generator 44. The first multiplexer 4231 following the first dual port RAM 4210 has an output side connected to a first data input of a third multiplexer 4233, and a second multiplexer 4232 following the second dual port RAM 4220 has an output side connected to a second data input of the third multiplexer 4233. The second multiplexer 4232 has an address input 4237 for the less significant part of the address read signal AR. A switchover signal SO is at the control input of the third multiplexer 4233, so that, for example, the aforementioned single bit of the binary pixel data is output and supplied to the data input of a following demultiplexer 4234. The multiplexer 4234 is followed by a resettable collecting register 4235 for binary pixel data that has a 14-bit parallel data output. The aforementioned single bit of the binary pixel data is transferred into the collecting register 4235 when a write signal WR is applied to a control input of the collecting register 4235. The multiplexer 4234 is supplied with a primitive address AP that sets the storage location of the bit in the collecting register 4235 and thus ultimately defines the sequence of the location at which the bit resides in the data stream that is serially communicated to the pen driver board 12. The collecting register 4235 successively generates groups of 14-bit binary data at its parallel data output that are communicated to the driver unit (pen driver board) of the ½-inch ink jet printhead. The appertaining primitive address can also be communicated to the driver unit via the shift register (in a way that is not shown). After the communication of a 22nd data group, all of the 300 binary pixel data that a ½-inch ink jet printhead needs have been communicated. The other half of the print image is printed by the first printhead. The pixel data-editing unit for the first printhead is constructed in an identical way. The overall print data controller preferably are realized with an application-specific circuit (ASIC) or programmable logic such as, for example, Spartan-II 2.5V FPGA of XILINX (www.xilinx.com).

FIG. 5*a* shows a simplified illustration of a print image of a postage meter machine with two printheads. The simplified print image 20 includes a franking stamp image 21, a postmark image 22 and an advertising stamp image 23 that are successively printed given movement of a franking item (not shown) in a transport direction (white arrow). The print image 20 is divided into two parallel regions 201 and 202 that are arranged orthogonally relative to the franking matter transport direction. The printhead 1 prints only the region 201 and the printhead 2 prints only the region 202 when the franking item moves in the transport direction. Each of the two regions 201 and 202 is a half-image of the print image that is intersected by common print image columns 1 through n arranged orthogonally relative to the transport direction.

FIG. 5*b* shows the arrangement of the two printheads for printing the print image onto a surface of a piece of mail that is moved relative to the printheads in transport direction (white arrow). The nozzle rows r1, r2 of the two printheads 1 and 2 are offset from one another by a distance d in transport direction and overlap over a distance f in column direction of the print image. The distance d corresponds to k print image columns. A surface of a piece of mail first enters into the printing region of the second printhead 2, a first number of print image columns 1 through k−1 of the region 202 being printed on this surface. The first printhead 1 prints the first print image column at the same point in time when the $k^{th}$ print image column is printed by the second printhead 2. This offset is taken into consideration in the arrangement of binary pixel data in the pixel memory.

FIG. 6 shows an illustration of pixel data for two half-images that are stored in the pixel memory. One print half-image is provided for printing with each printhead and is stored completely undistorted in the pixel memory. Only the pixel data having the data value "one" are shown as darkened points. The pixel data having the data value zero are shown as white. It is assumed as a simplification that all nozzles of a printhead lie in a single row that is aligned parallel to a print image column. The presentation of pixel data for the first print half-image begins in position 1. The appertaining pixel data for a simplified print image exist for two print half-images and are shown offset by a distance K, whereby a first region 212 of a presentation of pixel data for the lower half of the print image begins with the data value "zero" for pixel data in the leader 213, and a second region 222 of a presentation of pixel data for the upper half of the print image ends with the data value "zero" for pixel data in the trailer 223. Both, i.e. the leader and trailer, characterize the aforementioned offset that must be taken into consideration in the address space of the pixel memory. Due to the offset, the presentation of pixel data for the second print half-image, which corresponds to the lower half of the print image, does not begin until the position K. A first number of binary pixel data in the presentation of pixel data in a position M lie on a line that corresponds to the position of the print image column m in the second print image region 202 according to FIG. 5*a*. A second number of binary pixel data in the presentation of pixel data in a position M+K, i.e. at a different position offset by K, lie on a line that reflects the print image column m in the first print image region 201 according to FIG. 5*a*.

When two or more nozzle rows per printhead exist, whereby the nozzles of different nozzle rows are offset relative to one another (interlaced), a print image can be printed with a number of pixels that is doubled or even higher. The additional binary data must then be stored in a suitable order in the pixel memory that allows an easy modification of picture elements.

FIG. 7 shows an illustration of pixel data for four print half-images in the pixel memory. For space reasons and clarity, the four print hag-images have been shown drawn below one another. In practice, the pixel data for a print image column are arranged, for example, in four successive memory areas. In the illustration, for example, a first area 212 and a second area 222 are provided for the binary pixel data for the respective second nozzle rows per printhead, and a third area 221 and a fourth area 211 are provided for the additional binary pixel data for the respective first nozzle rows per printhead. For simplicity, the binary pixel data of the four print half-images having the data value "one" are shown connected to one another as solid lines. The shape of the picture elements of the print image is preserved in this reflection of the printimage by the binary pixel data.

FIG. 8 shows an arrangement of two printheads for printing a print image with double the resolution. Each printhead has two nozzle rows r11 and r12, or r21 and 22, which respectively assume a distance g from one another. Further, a distance f orthogonal to the transport direction is shown wherein the nozzles overlap in the edge region of the nozzle rows of the two printheads. The respective first or second nozzle rows of the two printheads 1 and 2 are parallel to one another. The two printheads 1 and 2 are spaced by a distance d in the transport direction. Given a postal ½-inch ink jet printhead with bubble-jet technology that is arranged in a cartridge, for example type HP 5165A of Hewlett Packard, all nozzles having an odd number lie in the nozzle row having an odd number or, respectively, all nozzles having an even number lie in the nozzle row having an even number.

Due to the aforementioned offset d of the printheads 1, 2 in the transport direction, the presentation (shown in FIG. 7) of pixel data for the first print half-image to be printed by the second nozzle row r12 of the first printhead 1 does not begin until position K.

Due to the aforementioned offset of the respective nozzle rows r11, r12 and r21, r22 of the printheads 1, 2, the presentation (shown in FIG. 7) of pixel data for the third print half-image to be printed by the first nozzle row r21 of the second printhead does not begin until position G.

Due to the aforementioned offset of the printheads 1, 2 in the transport direction and the aforementioned offset of the nozzle rows of each of the printheads, the presentation (shown in FIG. 7) of pixel data for the first print half-image to be printed by the first nozzle row r11 of the first printhead does not begin until position K+G.

Further sequences of binary data in the pixel memory that allow an easy modification of picture elements are possible.

FIG. 9a shows an illustration of pixel data for four print half-images in the pixel memory for a preferred arrangement of the pixel data. A data string of binary pixel data from the pixel memory composed of 20 successive data words each having 16 binary pixels yields an identical map of the pixels with even numbers of a first print image column and of the pixels with odd numbers of a second print image column that are printed onto an approximately ½-inch width by an ink jet printhead having two nozzle rows.

A pattern with such data strings arranged in columns—as shown in FIG. 9a—thus yields an identical map of the part of the franking stamp print image printed by an ink jet printhead with a width of approximately ½-inch. The binary pixel data that are printed by the same printhead lie in one and the same region 201 or 202 and are presented in neighboring data strings arranged column-by-column. The same, aforementioned ordering of the data strings applies in both regions. The binary pixel data for print half-images that can be allocated to different nozzle rows of the same printhead are arranged in mutually offset positions in the same region 201 or 202 in the presentation, i.e. the binary pixel data of the print half-images of a half of the print image can be arranged successively interlaced or interleaved in the pixel memory. The presentation of the binary pixel data of the two print half-images for the two nozzle rows of the same printhead is shown dotted in a region 202 that reflects the upper half of the print image. Each dot is intended to reflect a binary pixel datum with the data value 'one'. The binary pixel data for the nozzles of the nozzle row with an even number or the binary pixel data for the nozzles with an even number lie in the data string that is shown at the first position and have, for example, the data value 'one'. The binary pixel data for the nozzles of the nozzle row with an odd number or the binary pixel data for the nozzles with an odd number that lie in the data string that is shown at the first position have, for example, the data value 'zero'.

The binary pixel data for the nozzles of the nozzle row having an odd number or the binary pixel data for the nozzles having an odd number lie in the data string that is shown at the position G and have, for example, the data value 'one'. The binary pixel data for the nozzles of the nozzle row having an even number or the binary pixel data for nozzles having an even number that lie in the data string that is shown at the position G have, for example, the data value 'zero'. Although the binary pixel data d210 of the frame of the franking stamp image are stored in mutually offset positions (for example, M and M+G) for the two print half-images, when printing a print image column (for example, m) they are printed at different points in time as two rows of pixels that (ideally) lie above one another, so that the two practically produce a single line in the print image column direction after the printing. Only for distinguishing the reflection of the lower half of the print image, a solid, thick line is employed in a further region 201 of FIG. 9a in order to also show the binary pixel data of the two print half-images for the two nozzle rows of the other printhead as a simple pattern.

The illustration for the column-by-column printing of pixels in FIG. 9b shows a print image column n into which both aforementioned rows of pixels fall. A first nozzle row r1 prints a first pixel P×1, and a second column row r2 prints a first pixel P×2 that exhibit a spacing h orthogonal to the transport direction. Binary pixel data for nozzles with odd or even numbers exist in the pixel memory for such a print image column. 32 bits are stored per data word. Respective addresses are allocated to these data words.

FIG. 10a shows an illustration of the binary pixel data of a picture element for an arrangement of two printheads with only one nozzle row, corresponding to FIG. 5b. The binary pixel data are stored in a sub-area of the pixel memory. For a map E of a picture element, those binary pixel data that have the value 'one' are shown as black picture elements. The value 'zero' is not shown in black. Ten data words W1 through W10 of respectively 32-bit binary data form a data string with binary pixel data that are required for printing a print image column with one nozzle row. A first data string of 320 binary pixel data is shown by means of white dots at the right in FIG. 10a, these lying in the position 1 on a row.

The binary pixel data of the first data string are consecutively numbered from the data number D#=1 through the data number D#=320 and have the value 'zero'.

For space reasons, the presentation ends with a data string at the position M+L, and only a region addressable with the respectively first three data words W1, W2 and W3 of a data string has been shown interconnected, only approximately one-third of the binary pixel data required for 300 nozzles being addressable therewith. This, however, is not intended to represent a limitation for a presentation of data strings. A practical limitation exists only from the maximum number of data words that-are storable in a pixel memory. The numbering of the binary pixel data employed in the illustration corresponds to the numbering of the nozzles in a nozzle row and begins with the number one in the first group for each data string. The numbering of the binary pixel data of the tenth group ends with the number 320. This repeats for each data string until the position m has been reached. As was explained on the basis of the arrangement (shown in FIG. 6) of binary pixel data for two print half-images in the pixel memory, the picture element E already can be addressed by means of a first data word W1. This repeats up to the position M+L and—because each binary value 'one' is shown as a black dot—the map E of the picture element as a black box thus arises. Given twelve first binary pixel data having the value 'one' for a number of data strings from the position M up to the position M+L, whereby L is assumed to be equal to 6, the aforementioned black box is printed by one of the two printheads with a single nozzle as a pixel field that is 12 pixels long and 6 pixels wide and that has a resolution of 600*300 dpi. For example, a data matrix code has 48×48 picture elements.

Since such ink jet printheads with only one nozzle row and with the required resolution are not always available, the illustration in FIG. 10b refers to commercially available, postal ½-inch ink cartridges of the type HP 51645A of Hewlett Packard. These have two nozzle rows per ink jet printhead. For example, an imprint with a resolution of 300 dpi in the transport direction and with a resolution of 600 dpi in the direction orthogonal to the latter is enabled on a one-inch wide tape with the ink jet printheads of this type—in the arrangement shown in FIG. 8.

FIG. 10b shows an illustration of the binary pixel data of a picture element that is advantageously stored divided in the pixel memory. The binary pixel data of a picture element for the nozzles having an even number D# and for the nozzles having an odd number D# lie in different data strings in what is always a data word of equal rank.

The binary pixel data with the data value 'one' for the nozzles of the nozzle row having an even or, respectively, odd number or—stated differently—for the odd or, respectively, even numbers of the nozzles form a respective maps E1 and E2 of the picture element. In the present example, both maps E1 and E2 lie in the first data word of different data strings. The binary pixel data having the data value 'one' for the nozzles of the nozzle row having an even or odd number or—stated differently—for the odd or even numbers of the nozzles lie in data strings at the position M≦E1≦position M+L or, respectively, at the position M+G≦E2≦position M+G+L. The binary pixel data with the data value 'one' and with the same data number of immediately adjacent data strings were shown not as a dot but as a thick black stroke only for illustration.

Again for space reasons, only a region addressable with the respectively first three data words W1, W2 and W3 of a data string has been shown interconnected, this sufficing for an illustration of the binary pixel data of the maps E1, E2 of the picture element. In both illustrations of FIGS. 10a and 10b, the stored binary pixel data of a picture element respectively lie within a 32-bit data word W1. Advantageously, no further 32-bit data words need to be called, particularly when variable picture elements are varied from imprint to imprint. Computing time of the microprocessor is thus saved. Preferably, thus, an ordering is organized in the pixel memory that was already explained in conjunction with FIG. 9a and that makes it possible to reduce the number of data words that must be called by the microprocessor in order to modify a picture element.

FIG. 10c shows an illustration of the binary pixel data of a picture element in the pixel memory that are stored in a known way, whereby the pixel data are arranged in the pixel memory so as to be successively read out when printing. For reflecting the picture element, a map E2 of binary pixel data with even data numbers D# and a map E1 of binary pixel data with odd data number D# are again present, with the binary pixel data having the data value 'one' and with the same data number being shown as a thick, black stroke. Differing from the illustrations shown in FIGS. 10a and b, the even data numbers D# and odd data numbers D# of the stored binary pixel data in the illustration according to FIG. 10c no longer have the same numbers as the driven, allocated nozzles of a printhead. The data numbers D#=0 through 240 were indicated for illustrating the binary data that are used for a printing of the aforementioned picture element. The picture element is printed out by the appertaining nozzles D1 through D12 of a printhead. The scale of the illustration has to be reduced for space reasons in order to illustrate the increased outlay when accessing the stored binary pixel data that the microprocessor must access given a modification of only one picture element in the print image. The increased outlay is also caused by the data words W1, W4, W7 and W8 that lie far apart. It is clear that the computing time of the microprocessor is greater when the stored binary pixel data of a picture element are distributed according to a complicated pattern, or lie far apart in data words that are not of equal rank, so that many steps are required in order to implement a modification of a picture element or in the pattern of the print image.

Figure 11:
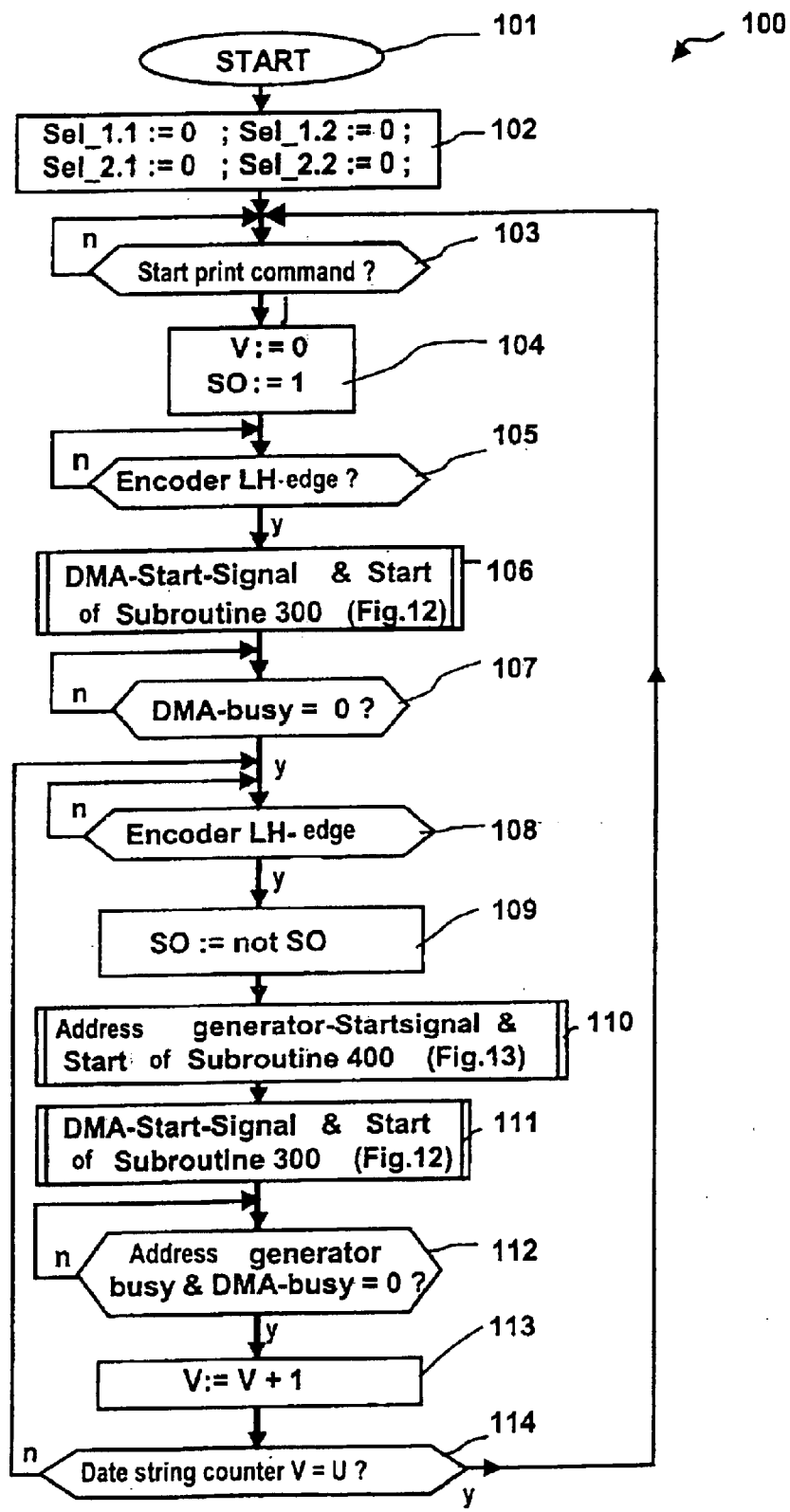
FIG. 11 is a flowchart of the executive sequence control of the printer controller.

FIG. 11 shows a flowchart of the executive sequence control of the printer controller. After the activation in step 101, a step 102 is reached, and all selection signals Se1_1.1, Sel_1.2, Sel_2.1, Sel_2.2 are set to the value 'zero' in the routine 100 of the executive sequence control. In a first interrogation step 103, a data word communicated via a bus is evaluated in view of the occurrence of a command to start printing. When this command has not yet been given, then a branch is made into a waiting list. After the start of printing a setting of the column count value V to the value 'zero' ensues in a step 104. The switchover signal SO is set to the value 'one' and output. In a second interrogation step 105, the encoder signal e is evaluated in view of the occurrence of a left edge. If this has not yet appeared, then a branch is made into a waiting list. Otherwise, a signal DMA start is output in a step 106, and a sub-routine 300 is started that sets specific selection signals Sel_1.1, Sel_1.2, Sel_2.1 or Sel_2.2 to the value 'one' in order to transfer the binary pixel data into the buffer memories of the pixel data editing units 41 and 42, which shall be explained in even greater detail later on the basis of FIG. 12.

In a third interrogation step 107, the DMA busy signal is evaluated to determine whether it has been set to the value 'zero'. If this is not yet the case, then a branch is made into a waiting list. If, however, the DMA busy signal has been set to the value 'zero', then a fourth interrogation step is reached wherein the encoder signal is evaluated as to the occurrence of a left edge. If this has not yet appeared, then a branch is made into a waiting list. Otherwise, the switchover signal SO is logically negated in a step 109 and then output. Subsequently, the address generator is activated in a step 110, and a sub-routine is started that generates read addresses AR intended for the pixel data editing units 41 and 42 and control signals such as the switchover signal SO, the primitive address AP, the write signal WR and a load signal LD. In step 111, a DMA start signal is output and the DMA controller is activated for renewed starting of the sub-routine 300. The two sub-routines 300 and 400 are executed parallel to one another. In a fifth interrogation step 112, an evaluation is made as to whether the address generator is finished with its sub-routine 400 and whether the DMA busy signal has been set to the value 'zero'. If neither has yet occurred, then a branch is made into a waiting list. When, however, the address generator has finished its sub-routine 400 and the DMA busy signal has been set to the value 'zero', then a step 113 is reached. In step 113, the data string count value is incremented V:=V+1.

In a sixth interrogation step 114, a determination is made as to whether the column count number V has reached a limit value U. if this is not yet the case, then a branch is made to the fourth interrogation step 108. Otherwise, a branch is made to the first interrogation step 103 and the routine begins anew when a print start command is found in the first interrogation step 103.

Figure 12:
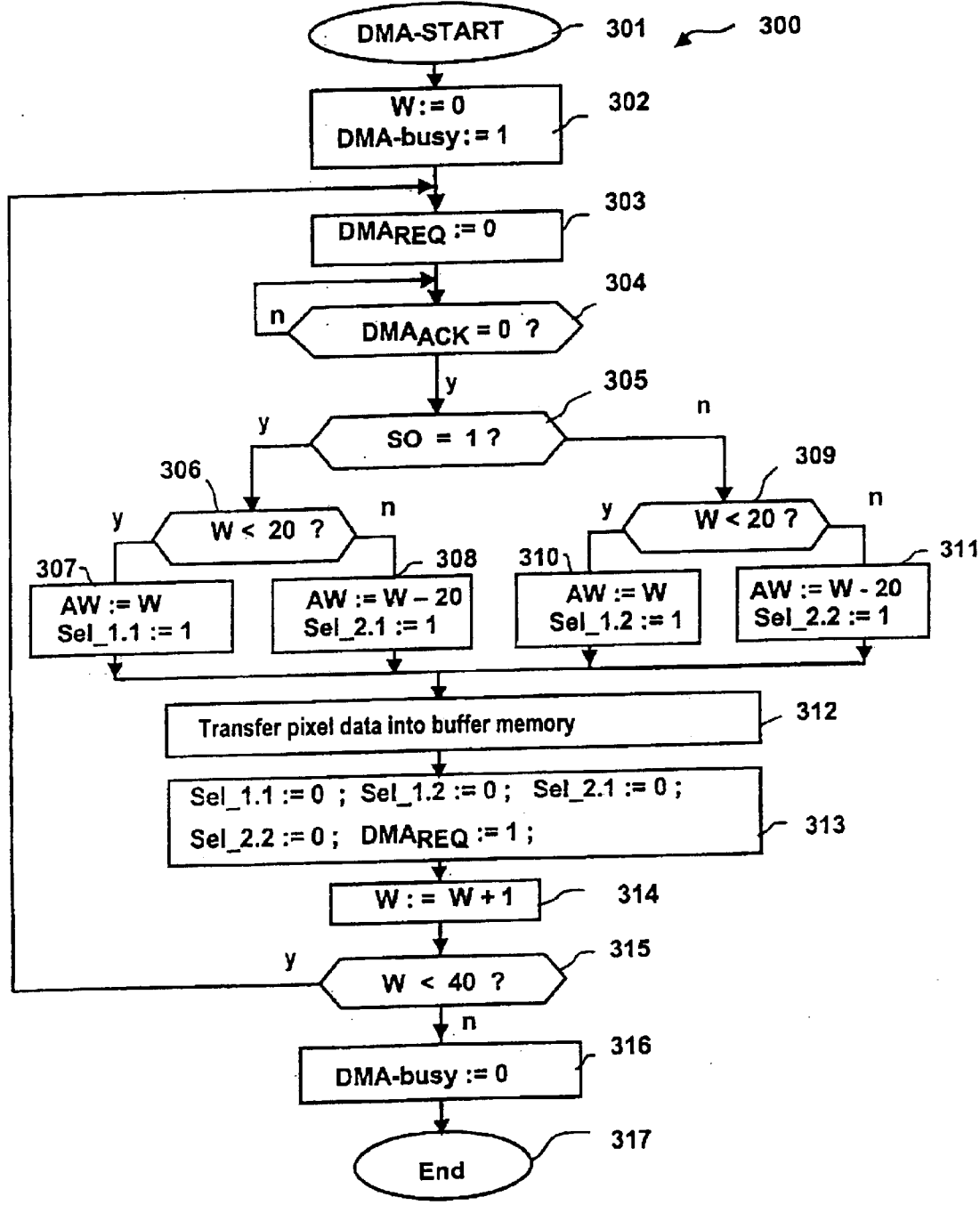
FIG. 12 is a flow chart of the DMA control.

FIG. 12 shows a flowchart for the DMA controller. Such a sub-routine is called when the printer controller 45 outputs a DMA start signal to the DMA controller 43 (step 301 ). A word count value W is set the value 'zero' in a step 302 of the sub-routine 300. A DMA busy signal is set to the value 'one' and communicated to the printer controller 45. A DMA request signal $DMA_{REQ}$ having a value 'zero' is communicated to the microprocessor 6 in a further step 303 of the sub-routine 300. Said microprocessor 6 communicates an acknowledge signal $DMA_{ACK}$ to the DMA controller 43. In a first interrogation step 304 of the sub-routine 300, a branch is made into a waiting list given non-reception of the acknowledge signal $DMA_{ACK}$ with a value 'zero'. Upon reception of the acknowledge signal $DMA_{ACK}$ with a value 'zero', a further branch is made from the first interrogation step 304 of the sub-routine 300 to a second interrogation step 305, whereby the status of the switchover signal SO is determined. When the switchover signal SO has the status equal to 'one', then a branch is made to a third interrogation step 306. Otherwise, the switchover signal SO has the status equal to 'zero', and a branch is made to a fourth interrogation step 309. A check is carried out in the third interrogation step 306 as to whether the word counter exhibits a value W of less than twenty. In this case (W<20), a branch is made to a step 307. In step 307, the first selection signal for the first printhead Sel__1.1 is switched to the value 'one', and the address write signal AW receives the current value W of the word counter. In the following step 312, the pixel data are transferred into the buffer memories of the pixel data-editing units 41, 42. In step 313, subsequently, all selection signals are switched to the value 'zero', and a DMA request signal $DMA_{REQ}$ having a value 'one' is communicated to the microprocessor 6.

In step 314, the word count value W is incremented with the value 'one'. A check is made in a subsequent interrogation step 315 to determine whether the word counter exhibits a value W less than forty, In this case wherein the word counter exhibits a value W<40, a branch is made back to a step 308. Otherwise, a branch is made to a step 316 in order to output a signal DMA busy before the end (step 317 ) of the sub-routine 300 has been reached.

Otherwise, i.e. if it is determined in the third interrogation step 306 that the word count value W is not less then twenty, a branch is made to a step 308 in which the first selection signal for the second printhead Sel__2.1 is switched to the value 'one', and the address write signal AW receives the current value W of the word counter minus the value 'twenty'. In the following step 312, the pixel data are again transferred into the buffer memory.

A check is likewise made in the aforementioned fourth interrogation step 309 to determine whether the word counter exhibits the value W<20, even if it was found previously in the interrogation step 305 that the switchover signal SO does not exhibit the status equal to one. When the word counter exhibits the value W<20, then the second selection signal for the first printhead Sel__1.2 is switched to the value 'one' in the step 310, and the address write signal AW receives the current value W of the word counter. The pixel data are again transferred into the buffer memory in the following step 312.

Otherwise, when the word counter does not exhibit the value W<20, a branch is made from the fourth interrogation step 309 to a step 311 wherein the second selection signal for the second printhead Sel__2.2 is switched to the value 'one', and the address write signal AW receives the current value W of the word counter minus the value 'twenty'. The pixel data are again transferred into the buffer memory in the following step 312.

Figure 13:
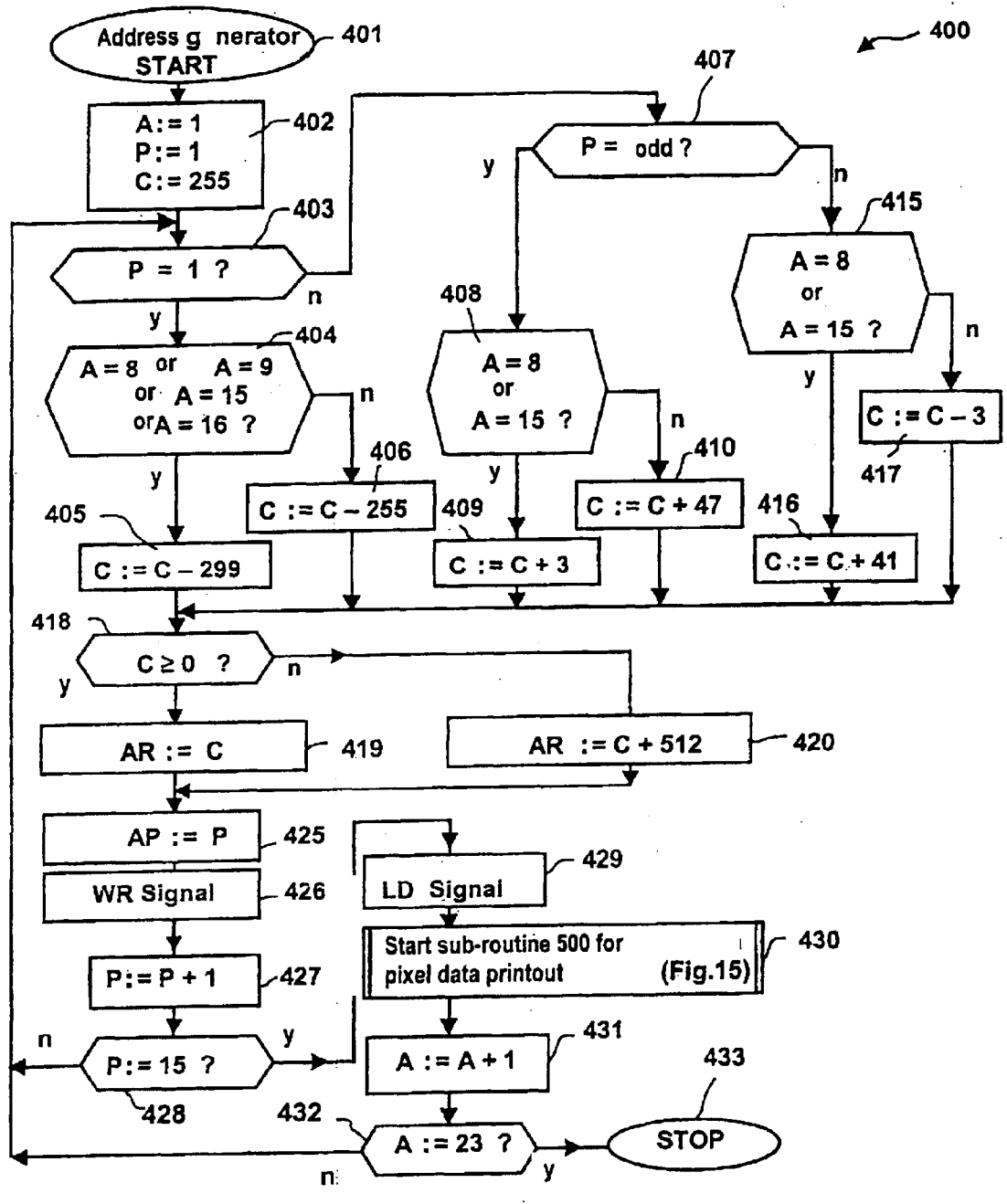
FIG. 13 is a flowchart for the address generation.

FIG. 13 shows a flowchart for the address generation. The addresses of stored binary pixel data at both printheads begin with the start address 'zero', which is generated in the following way for the address read signal AR. After the start in step 401, the start values are called in step 402, A:=1 for a counter of the address group, P:=1 for a counter of the primitive address AP and C:=255 for a counter of the address read signal AR. In the first interrogation step 403, a determination is made as to whether the numerical value P of the counter of the primitive address is equal to the value 'one' is queried. If this is the case, then the second interrogation step 404 is reached. A determination is made here as to whether the counter A has reached the value 8 or 9 or 15 or 16. If this is the case, then the step 406 is implemented, and the numerical value 255 is subtracted from the numerical value C of the counter of the address read signal AR. A determination is made in the following, third interrogation step 418 that the numerical value C of the counter of the address read signal AR is equal to/greater than the value zero, and a branch is then made to the step 419 for the output of the address read signal AR. Otherwise, a branch is made to the step 420 in order to add a numerical value 512 to the negative numerical value. The steps 425, 426 and 427 are run after the steps 419 and 420.

The numerical value for the counter of the primitive address AP is output in step 425. A write signal WR for the entry of the binary pixel datum into a collecting register is then output in step 426. The numerical value for the counter of the primitive address AP is incremented by the value one in step 427. A fourth interrogation step 428 has then been reached, and a determination is made that the numerical value P of the counter of the primitive address AP has not yet reached the limit value 15. Subsequently, a branch is made back to the first interrogation step 403.

A determination is then made in the first interrogation step 403 that the numerical value P of the counter of the primitive address is not equal to the value one and a branch is made to the fifth interrogation step 407. If the numerical value P is odd, then a branch is made to the sixth interrogation step 408 in which a check is carried out to see whether the counter of the address group has the value 8 or 15. If this is the case, then a branch is made to a step 409, and the numerical value 3 is added to the numerical value C of the counter of the address read signal AR. Otherwise, a branch is made from the sixth interrogation step 408 to a step 410, and the numerical value 47 is added to the numerical value C of the counter of the address read signal AR.

If, however, the numerical value P is even, then a branch is made from the fifth interrogation step 407 to the seventh interrogation step 415 wherein a check is carried out to see whether the counter of the address group has the value 8 or 15. If this is the case, a branch is made to a step 416, and the numerical value 41 is added to the numerical value C of the counter of the address read signal AR. Otherwise, a branch is made from the seventh interrogation step 415 to a step 417, and the numerical value 3 is subtracted from the numerical value C of the counter of the address read signal AR.

Proceeding from the steps 405, 406, 409, 410, 416 and 417, the third interrogation step 418 is reached again and a determination is made as to whether the numerical value C of the counter of the address read signal AR is greater than/equal to the value zero. Following the steps 419 and 420, the steps 425, 426 and 427 are run again until the fourth interrogation step 428 has been reached, a determination being made therein as to whether the numerical value P of the counter of the primitive address AP has already reached the limit value 15. If this is the case, then a branch is made to a step 429 and a load signal for loading the shift register is output. In order to print the pixel data out, a sub-routine 500 is started in step 430 wherein—among other things—a shift clock signal SCL is applied to the shift register in order to serially output the pixel data from the latter. In step 431, subsequently, the value of the counter of the address group is incremented by the value one. An eighth interrogation step has then been reached wherein a determination is made as to whether the numerical value A of the counter of the address group has already reached the limit value 23. If this is not the case, then a branch is made back to the first interrogation step 403. If, however, the limit value 23 has already been reached, then the sub-routine is stopped in step 434.

FIG. 14 shows a table for the address generation by means of the aforementioned routine 400. In practice, the address generator 44 preferably generates the address values as a binary number and this is applied to the pixel data-editing units 41, 42. As is known, a binary number can be represented, for example, as a hexadecimal number or as a decimal number, as a result whereof the representation requires less space. Decimal numbers are entered in the table only for this reason and for ease of comprehension. The routine 400 first generates a primitive address P:=1 and a binary number zero as address read signal AR for a first address group A:=1. A corresponding binary number as address read signal AR for the first address group A:=1 is then successively generated up to a primitive address P:=14. The address read signal AR (address read) is thus generated for 14 binary numbers per address group. Corresponding binary numbers as address read signal AR thus are generated successively for 22 address groups. A binary pixel datum in the buffer memory is accessed by each and every address read signal AR.

The driver units 11 and 12 ignore the binary pixel data that are read given address values A=1 with P=2, A=7 with P=13, A=8 with P=1 and with P=14 A=15 with P=1 and with P=14, A=16 with P=2 as well as A=22 with P=14. The address values higher than 500 therefore need not be capable of being completely generated as binary number. For offering binary pixel data, all address values higher than 299 are in fact generated but are likewise not required when printing.

The routine 400 is implemented until all print image columns have been printed. It has already been explained in conjunction with FIGS. 9a, 9b and 10b that the nozzle rows of a printhead become active in alternation for printing print image columns. While one of the buffer memories is being loaded with binary pixel data by direct memory access, the other buffer memory is read out in order to transmit edited groups of binary pixel data to the driver units. The mutual repetition of the routine 400 and further subsequent steps are implemented by the printer controller 45 that, controlled by a signal e of an encoder 3, also generates the print signals Print1 or Print2.

Figure 15:
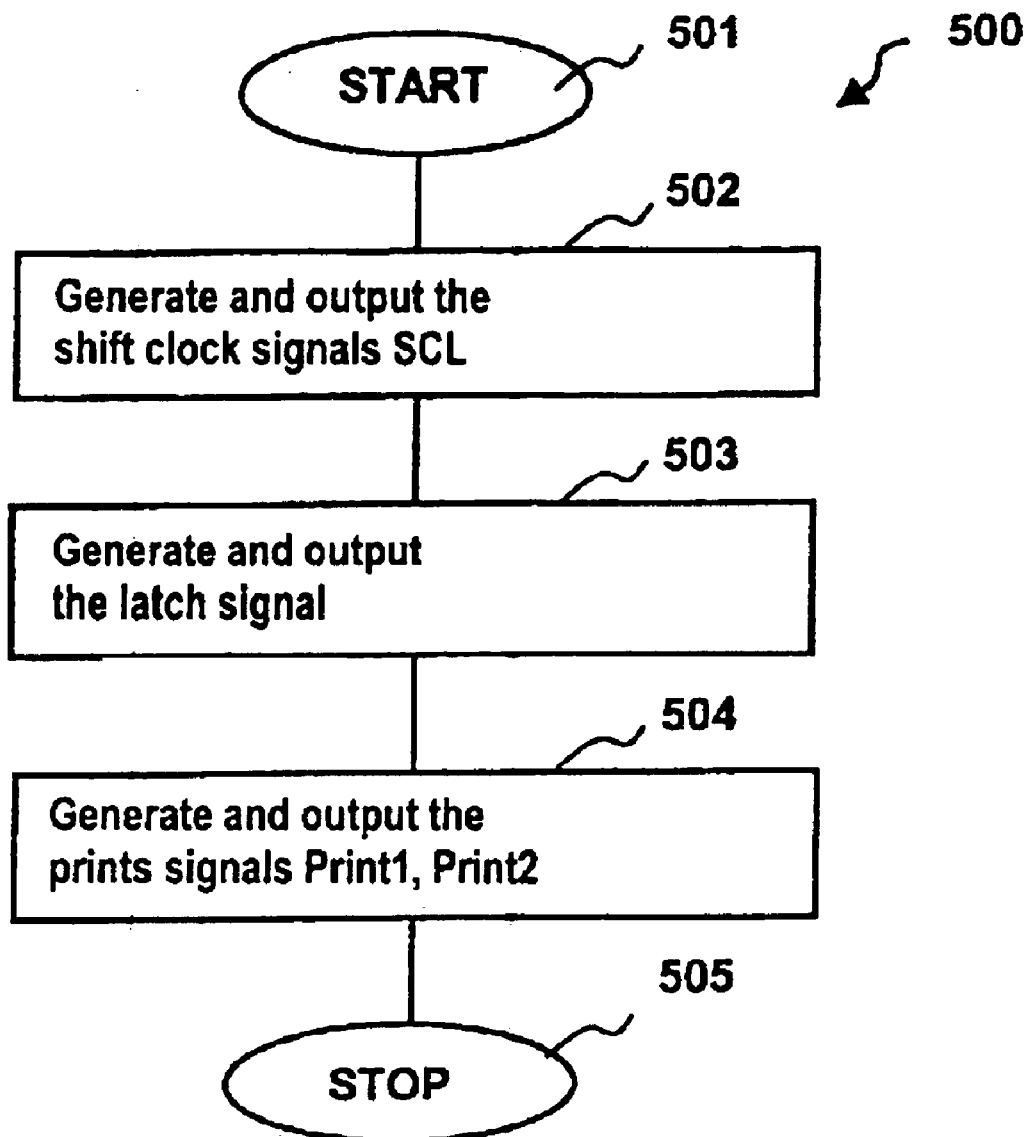
FIG. 15 is a flowchart of the print routine.

FIG. 15 shows a flowchart of the print routine 500. The print routine 500 is called as a sub-routine during the course of the sub-routine 400 in order to drive the shift registers in the print data control 41, 42 and in order to drive the driver units (pen driver boards) 11, 12. After the start in step 501, a step 502 is reached and a shift clock SCL is generated in order to move the pixel data stored in the shift register from the shift register to the respective driver unit 11 or 12 via the serial data output. Subsequently, a latch signal is generated in step 503 and is supplied to the driver units (pen driver boards) 11, 12. The print signals Print1, Print2 are then generated in step 504 and output to the driver units (pen driver boards) 11, 12, and the sub-routine 500 is stopped in step 505.

In an alternative embodiment having only a single printhead, of course, only a single pixel data editing unit 42 and the specific controller 43, 44 and 45 are required. When the printhead is equipped with only a single nozzle row for printing a print image column, then the sequence of the binary pixel data in the data string coincides with the sequence of the pixels in the print image column. Consequently, the sequence of the binary pixel data is then even modified print image column-by-print image column during printing in conformity with the type of printhead.

The invention is employable with a single printhead with one or more nozzle rows with orthogonal alignment relative to the transport direction as well as with a number of such printheads. Given an employment of printheads that require a different sequence of supplied binary pixel data, particularly printheads from other manufacturers, the flowchart shown in FIG. 11 and the appertaining table, may need to be appropriately modified. The sequence of the binary pixel data is modified as needed by data strings according to the printhead type during printing in conformity with the method disclosed herein.

Independently of all embodiments, the arrangement of binary pixel data in the pixel memory RAM 7 can be organized such that a modification of picture elements is possible in an easy and uncomplicated way. The print data control for the pixel data editing during printing with a printhead thus enables a greater flexibility in view of requirements of various national postal authorities for a printing mail-processing device.

Although modifications and changes may be suggested by those skilled in the art, it is the intention of the inventors to embody within the patent warranted hereon all changes and modifications as reasonably and properly come within the scope of their contribution to the art.

We claim as our invention:

1. A mail-processing device comprising:

at least one printhead;

a pixel memory containing binary pixel data, representing information to be printed by said at least one printhead, stored as a plurality of data strings consisting of successive data words with a predefined number of successive data words forming a data string;

a print data controller having access to said pixel memory and connected to said at least one printhead for controlling printing of said information by said at least one printhead, said print data controller comprising a Direct Memory Access (DMA) controller and an address generator and, for each printhead, a print data editing unit, the print data editing unit containing two buffer memories; and said DMA controller transferring said binary pixel data word-by-word from said pixel memory into said two buffer memories with successive words in one of said data strings being alternatingly entered into one of said two buffer memories, for intermediate storage therein, said print data editing unit edits the data words stored in the other of said two buffer memories at respective addresses designated by said address generator, with said printhead printing the information represented by the data word stored in said other of said buffer memories.

2. A mail-processing device as claimed in claim 1 wherein said DMA controller generates address write signals and selection signals relating to said intermediate storage of said data words in said two buffer memories, said address generator generates and supplies said address signals and control signals to said pixel data editing unit, and with said pixel data editing unit using said data words respectively stored in said buffer memories for editing in said pixel data editing unit in selected groups and in a selected sequence dependent on said address signals and said control signals.

3. A mail-processing device as claimed in claim 1 wherein said DMA controller generates address write signals and uses said address write signals to write said data words of said data string from said pixel memory respectively into said two buffer memories, and includes a cycle counter for counting said predefined number of data words.

4. A mail-processing device as claimed in claim 1 wherein said printer controller comprises a switchover signal generator, which generates a switchover signal supplied to said pixel data editing unit, for controlling the editing of the respective data words, by said pixel data editing unit, and using said at least one printhead for printing said information, and wherein said switchover signal generator also supplies said switchover signal to said DMA controller, and wherein said DMA controller generates respective selection signals, dependent on said switchover signal, for causing transfer of another data word from said pixel memory into said print data editing unit.

5. A mail-processing device as claimed in claim 1 comprising first and second printheads, and wherein said print data controller comprises a first print data editing unit having two buffer memories and a second print data editing unit having two buffer memories, and wherein said DMA controller includes a cycle counter, and wherein said print data controller generates a switchover signal supplied to said DMA controller, and wherein said DMA controller includes a first comparator and a second comparator, and wherein said DMA controller generates a DMA start signal which causes said cycle counter to begin counting a predetermined number of data words in said data string from said pixel memory, and wherein said first comparator, dependent on said switchover signal, causes said DMA controller to supply a respective selection signal to said first pixel data editing unit until said predetermined number of data words is reached, and for causing said DMA controller to supply a respective selection signal to said second pixel data editing unit after said predetermined number of data words is reached, and wherein said second comparator generates a DMA busy signal having a zero value after a second predetermined number of data words is counted by said cycle counter, to end counting by said cycle counter.

6. A mail-processing device as claimed in claim 5 wherein each of said first and second pixel data editing units comprises a shift register operable in combination with the two buffer memories in that pixel editing unit, for parallel-to-serial conversion of said pixel data and wherein said address generator generates a load signal supplied to the shift register in each of said first and second print data editing units to cause loading of serial data from the respective print registers to the respective first and second printheads.

7. A mail-processing device as claimed in claim 6 wherein said address generator generates an address read signal having a plurality of bits, including more significant bits which designate an address in the first and second buffer memories, and less significant bits which allow addressing within a data word.

8. A mail-processing device as claimed in claim 1 comprising a transfer arrangement for conveying items past said at least one printhead on which said information is to be printed by said at least one printhead, said transfer arrangement including an encoder which generates encoder signals indicating a position of an item relative to said at least one printhead, and wherein said print data controller includes a printer controller having a data string counter, said data string counter being incremented after each data string is printed, and wherein said printer controller supplies a signal to said at least one printhead ending printing of said information when said data string counter reaches a predetermined count.

9. A mail-processing device as claimed in claim 1 wherein said print data controller comprises a printer controlled connected to said DMA controller, said printer controller generating a DMA start signal and supplying said DMA start signal to said DMA controller, and wherein said DMA controller comprises a cycle counter for counting said data words, starting upon receipt of said DMA start signal, and wherein said DMA controller subsequently generates a DMA busy signal having a value zero and supplies said DMA busy signal to said printer controller.

10. A mail-processing device as claimed in claim 1 wherein each of said buffer memories is a dual port RAM.

11. A mail-processing device as claimed in claim 10 wherein said print data controller comprises a first multiplexer having inputs connected to a first of said dual port RAMs, a second multiplexer having inputs connected to a second of said dual port RAMs, a third multiplexer having inputs connected to respective outputs of said first and second multiplexers, a demultiplexer having an input connected to an output of said third multiplexer and a collecting register having inputs connected to outputs of said demultiplexer, said first multiplexer selecting a single bit of said pixel data from said first of said dual port RAMs when less-significant bits of an address read signal, generated by said address generator, is supplied thereto, and wherein said second multiplexer selects a single bit of pixel data from said second of said dual port RAMs, and wherein said second multiplexer, dependent on a switchover signal generated by said print data controller, transfers the respective bits from said first and second multiplexors to said demultiplexer, and wherein said demultiplexer transfers successsive single bits into said collecting register at respective addresses determined by an address signal supplied to said demultiplexer.

12. A mail-processing device as claimed in claim 11 further comprising a shift registor connected to said collecting register, for transferring said bits from said collecting register to said at least one printhead.

13. A mail-processing device as claimed in claim 1 wherein said print data controller is an application-specific integrated circuit.

14. A mail-processing device as claimed in claim 1 wherein said print data controller comprises a programmable logic chip.

* * * * *